(12) United States Patent
Krishnamurthy et al.

(10) Patent No.: US 11,704,945 B2
(45) Date of Patent: Jul. 18, 2023

(54) SYSTEM AND METHOD FOR PREDICTING VEHICLE COMPONENT FAILURE AND PROVIDING A CUSTOMIZED ALERT TO THE DRIVER

(71) Applicants: Nissan North America, Inc., Franklin, TN (US); NISSAN MOTOR CO., LTD., Yokohama (JP)

(72) Inventors: Vikram Krishnamurthy, Marietta, GA (US); Yasuhiro Tanaka, Kanagawa (JP); Toru Takagi, Kanagawa (JP)

(73) Assignee: NISSAN NORTH AMERICA, INC., Franklin, TN (US)

( * ) Notice: Subject to any disclaimer, the term of this patent is extended or adjusted under 35 U.S.C. 154(b) by 325 days.

(21) Appl. No.: 17/008,355

(22) Filed: Aug. 31, 2020

(65) Prior Publication Data
US 2022/0068051 A1 Mar. 3, 2022

(51) Int. Cl.
*G07C 5/08* (2006.01)
*G07C 5/00* (2006.01)

(52) U.S. Cl.
CPC ........... *G07C 5/0808* (2013.01); *G07C 5/006* (2013.01); *G07C 5/008* (2013.01); *G07C 5/0825* (2013.01)

(58) Field of Classification Search
CPC ...... G07C 5/0808; G07C 5/006; G07C 5/008; G07C 5/0825
USPC ....................................................... 701/31.4
See application file for complete search history.

(56) References Cited

U.S. PATENT DOCUMENTS

| | | | |
|---|---|---|---|
| 7,650,210 B2 | 1/2010 | Breed | |
| 8,019,501 B2 | 9/2011 | Breed | |
| 8,036,788 B2 | 10/2011 | Breed | |
| 10,354,462 B1 * | 7/2019 | Zhang | G07C 5/085 |
| 2014/0277910 A1 * | 9/2014 | Suh | B60C 23/0476 |
| | | | 701/33.9 |
| 2016/0035150 A1 * | 2/2016 | Barfield, Jr. | G05B 23/0254 |
| | | | 701/29.3 |
| 2016/0035152 A1 * | 2/2016 | Kargupta | G06F 16/955 |
| | | | 701/31.5 |
| 2016/0071333 A1 * | 3/2016 | Haidar | G07C 5/008 |
| | | | 701/29.3 |

(Continued)

FOREIGN PATENT DOCUMENTS

CN 108229670 A 6/2018

OTHER PUBLICATIONS

V Prasanna, Large Scale Graph Analytics on FPGAs, https://h2rc.cse.sc.edu/2016/slides/prasanna_slides.pdf, Nov. 14, 2016, pp. 1-29, University of Southern California, USA.

*Primary Examiner* — Logan M Kraft
*Assistant Examiner* — John D Bailey
(74) *Attorney, Agent, or Firm* — Global IP Counselors, LLP

(57) ABSTRACT

Systems and methods for predicting component failure in a vehicle and alerting a driver based thereon. In an embodiment, the method includes receiving sensor data from at least one vehicle sensor over a period of time, processing the sensor data using a predictive model to detect an anomaly indicative of an upcoming component failure, determining a severity of the upcoming component failure based on at least one operating characteristic of the vehicle, and providing an alert to the driver of the vehicle regarding the severity of the upcoming component failure.

18 Claims, 9 Drawing Sheets

(56) References Cited

U.S. PATENT DOCUMENTS

| | | | |
|---|---|---|---|
| 2016/0133066 A1* | 5/2016 | Lavie | G07C 5/0808 |
| | | | 701/31.4 |
| 2018/0182187 A1* | 6/2018 | Tong | G06N 5/022 |
| 2018/0276913 A1* | 9/2018 | Garcia | B60L 3/0046 |
| 2019/0092495 A1* | 3/2019 | Lu | G07C 5/0816 |
| 2019/0130659 A1* | 5/2019 | Ide | G07C 5/006 |
| 2019/0176639 A1* | 6/2019 | Kumar | B60L 3/0046 |
| 2019/0213605 A1* | 7/2019 | Patel | G07C 5/0808 |
| 2019/0228596 A1* | 7/2019 | Mondello | G06N 20/00 |
| 2019/0255891 A1* | 8/2019 | Makke | G01N 3/56 |
| 2019/0311552 A1* | 10/2019 | Zhang | G07C 5/0816 |
| 2020/0209848 A1* | 7/2020 | Mercep | G01S 13/931 |
| 2020/0364953 A1* | 11/2020 | Simoudis | G06N 5/022 |
| 2021/0049444 A1* | 2/2021 | Bielby | G06N 3/088 |
| 2021/0049445 A1* | 2/2021 | Bielby | G06N 3/049 |
| 2021/0049480 A1* | 2/2021 | Kale | G05B 23/0283 |
| 2021/0049833 A1* | 2/2021 | Bielby | G06N 3/063 |
| 2021/0049834 A1* | 2/2021 | Kale | G07C 5/006 |
| 2021/0053574 A1* | 2/2021 | Bielby | B60R 16/0232 |
| 2021/0053575 A1* | 2/2021 | Bielby | G06V 10/82 |

\* cited by examiner

SYSTEM AND METHOD FOR PREDICTING VEHICLE COMPONENT FAILURE AND PROVIDING A CUSTOMIZED ALERT TO THE DRIVER

BACKGROUND

Field of the Disclosure

The present disclosure generally relates to a system and a method for predicting component failure in a vehicle and alerting a driver based thereon. More specifically, the present disclosure relates to a system and a method which predict the severity of the component failure and provide a customized alert regarding the severity.

Background Information

Throughout the life of a vehicle, various components will deteriorate and/or fail. In some cases, these components can be repaired or replaced before causing serious damage to the vehicle. In other cases, use of the vehicle after a component has deteriorated or failed can result in significant additional damage to other components of the vehicle. Thus, various component failures can result in significant consequences, such as sudden vehicle failure, expensive repairs, driver anxiety, and increased warranty costs.

SUMMARY

One object of the present disclosure is to provide systems and methods that can predict vehicle component failures with a high degree of accuracy, for example, using sensor data in accordance with various machine learning techniques. In doing so, the disclosed systems and methods can prevent sudden vehicle failure, reduce repair costs, put the driver's mind at ease, and/or reduce warranty costs by lessening the risk of severe failure due to the overuse of a failing component.

In view of the state of the known technology, one aspect of the present disclosure is to provide a method for predicting component failure in a vehicle and alerting a driver based thereon. The method includes receiving sensor data from at least one vehicle sensor over a period of time, processing the sensor data using a predictive model to detect an anomaly indicative of an upcoming component failure, determining a severity of the upcoming component failure based on at least one operating characteristic of the vehicle, and providing an alert to the driver of the vehicle regarding the severity of the upcoming component failure.

Another aspect of the present disclosure is to provide an alternative method for predicting component failure in a vehicle and alerting a driver based thereon. The method includes receiving sensor data from at least one vehicle sensor over a period of time, separating the sensor data into a plurality of characteristic data sets corresponding to different operating characteristics of the vehicle, processing at least one of the characteristic data sets using a predictive model to detect an anomaly indicative of an upcoming component failure, and providing an alert to the driver of the vehicle regarding the upcoming component failure.

Another aspect of the present invention is to provide a system for predicting component failure in a vehicle and alerting a driver based thereon. The system includes at least one vehicle sensor configured to generate sensor data relating to at least one vehicle component over a period of time, a memory storing at least one operating characteristic of the vehicle and at least one predictive model that has been trained using time-series data from a plurality of other vehicles, and a processor configured to execute instructions stored on the memory to: (i) process the sensor data using the predictive model to detect an anomaly indicative of an upcoming component failure; (ii) determine a severity of the upcoming component failure based on the at least one operating characteristic of the vehicle; and (iii) provide an alert to the driver of the vehicle regarding the severity of the upcoming component failure.

Other objects, features, aspects and advantages of the systems and methods disclosed herein will become apparent to those skilled in the art from the following detailed description, which, taken in conjunction with the annexed drawings, discloses exemplary embodiments of the disclosed systems and methods.

BRIEF DESCRIPTION OF THE DRAWINGS

Referring now to the attached drawings which form a part of this original disclosure.

DETAILED DESCRIPTION

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
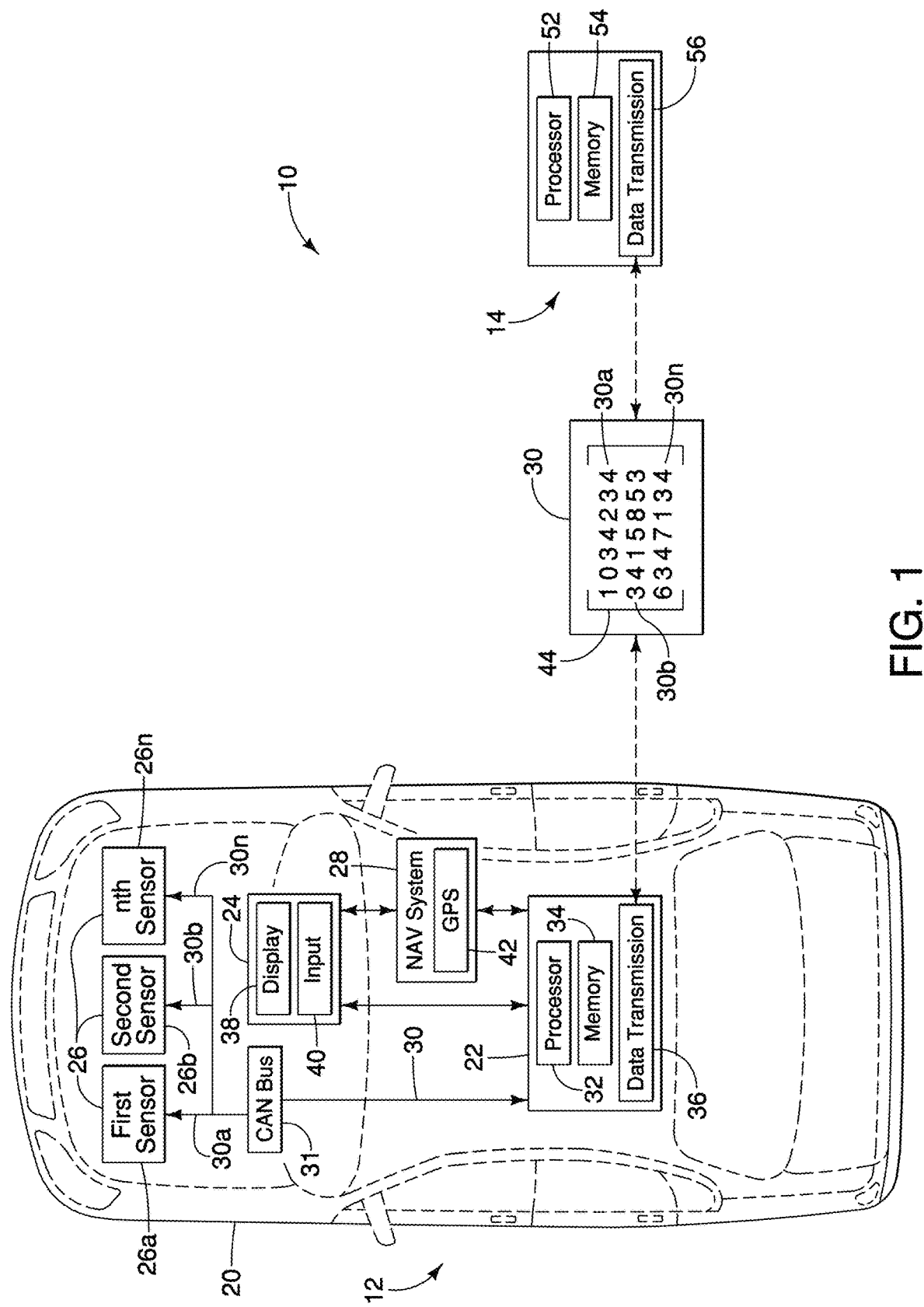
FIG. 1 is a schematic diagram of an example embodiment of a system for predicting component failure in a vehicle and alerting a driver based thereon in accordance with the present disclosure.

FIG. 1 illustrates an example embodiment of a system 10 for predicting component failure in a vehicle and alerting a driver. In the illustrated embodiment, the system 10 includes a vehicle 12 and a central controller 14 which are wirelessly connected, for example, via a network. As described in more detail below, the central controller 14 is configured to develop a predictive model PM using data from a plurality of vehicles V which are similar to the vehicle 12 for which the predictive model PM is applied. The predictive model PM can then be used to predict the failure of various components within the vehicle 12 and to thereafter provide customized alerts to the driver.

As used herein, a "component" of a vehicle can refer to any part, group of parts, system, subsystem and/or the like that can deteriorate and/or fail during use of the vehicle 12. Thus, any part, group of parts, system or subsystem of a vehicle 12, regardless of perceived significance to the operation of the vehicle 12, can be considered a "component" as used herein. For example, a component can include one or more of a light, a plug, a gasket, a sensor, a converter, a belt, a hose, a brake, a brake pad, a water pump, a fuel pump, a tire, a battery, one or more elements of a suspension, electronics, a transmission system, a monitoring system, an engine, and/or individual components thereof or larger systems including these smaller components.

As illustrated, the vehicle 12 can include a vehicle body 20 and a vehicle controller 22. The vehicle body 20 can include a user interface 24 and one or more sensor 26 (e.g., sensors 26a, 26b . . . 26n), which can each be placed in wired or wireless communication with the vehicle controller 22. The vehicle body 20 can further include a navigation system 28 placed in wired or wireless communication with the vehicle controller 22 and/or the user interface 24. In accordance with the methods discussed herein, the vehicle controller 22 is configured to gather sensor data 30 from one or more sensor 26, process the sensor data 26 using a predictive model PM or transmit the sensor data 26 to the central controller 14 for further processing using the predictive model PM, and cause an alert to be generated on the user interface 24 depending on the result of the processing. In an embodiment, the alert can include information based on location data generated using the navigation system 28.

The vehicle controller 22 can include one or more of a vehicle processor 32, a vehicle memory 34, and a data transmission device 36. Various example embodiments of the vehicle controller 22 are illustrated by FIGS. 6 to 9, although these embodiments are not intended to be limiting. The vehicle processor 32 is configured to execute instructions programmed into and/or stored by the vehicle memory 34. As described in more detail below, many of the steps of the methods described herein can be stored as instructions in the vehicle memory 34 and executed by the vehicle processor 32. The vehicle memory 34 can include, for example, a non-transitory storage medium. The data transmission device 36 can include, for example, a transmitter and a receiver configured to send and receive wireless signals to and from the central controller 14 in accordance with methods known in the art. For example, the data transmission device 36 can be configured for short-range wireless communication, such as Bluetooth communication, and/or for communication over a wireless network.

The user interface 24 can include one or more of a display 38 and an input device 40. In an embodiment, the display 38 and the input device 40 can be part of a graphical user interface such as a touch screen which enables a driver to input and view information regarding various aspects of the vehicle 12. The display 38 is configured to display, for example, the alerts generated by the methods discussed herein. In an embodiment, the user interface 24 can further enable the driver of the vehicle 12 to access the navigation system 28, for example, to navigate the vehicle 12 to a repair shop based on the alerts generated by the methods discussed herein.

The one or more sensor 26 can include a plurality of sensors 26 configured to generate various sensor data 30 regarding operation of the vehicle 12. In an embodiment, each sensor 26 is configured to generate sensor data 30 relating to at least one vehicle component over a period of time. In FIG. 1, the sensors 26 are illustrated as a first sensor 26a, a second sensor 26b, and an nth sensor 26n. Those of ordinary skill in the art should understand from this disclosure that any number of sensors 26 can be used, and that a vehicle 12 can include hundreds of such sensors 26. The types of sensors 26 can vary depending on the type of vehicle 12 and its features. The examples discussed herein are generally described with respect to a vehicle 12 include eighty (80) sensors 26, but these examples are not intended to be limiting. A plurality of sensors 26 can include, for example, an injector sensor, a vaporizing sensor, an A/F sensor, a fuel pump sensor, a valve sensor, a battery sensor, an ignition coil sensor, a contact sensor, a plug sensor, a valve sensor, a timing control sensor, a motion sensor, and/or any other sensor configured to generate sensor data 30 in accordance with the methods discussed herein.

In the illustrated embodiment, the vehicle 12 further includes a CAN ("Controller Area Network") bus 31 which connects the plurality of sensors 26 to the vehicle controller 22. Thus, the sensor data 30 from the sensors 26 can include CAN signals from the CAN bus 31. Those of ordinary skill in the art will also recognize from this disclosure that other configurations are possible.

The vehicle navigation system 28 can include a GPS device 42 or be placed in communication with a GPS device 42. The GPS device 42 can be configured to determine location data regarding the physical location of the vehicle 12 and communicate the location data to the vehicle controller 22 and/or the central controller 14 for use in accordance with the methods discussed herein. The GPS device 42 can determine the location data, for example, via communication with one or more global positioning satellite as known in the art. The GPS device 42 can also determine the location data, for example, via communication with one or more terrestrial units and a base station or external server. In an embodiment, the navigation system 28 can further be placed in operative communication with the user interface 24, such that the user interface 24 allows the driver of the vehicle 12 to input (e.g., select) a destination address using the input device 40 and utilize the navigation system 28 to generate route information that is displayed on the display 38.

During use of the vehicle 12, the vehicle controller 22 is configured to continuously or periodically collect and store sensor data 30 using the vehicle memory 34. The sensor data 30 can include data from the CAN bus 31 that is connected to the plurality of sensors 26. As discussed in more detail below, the vehicle controller 22 is configured to collect and store a plurality of data points from the sensor data 30 over a series of time. For example, the vehicle controller 22 can collect first sensor data 30a from the first sensor 26a over a series of time (e.g., every 1 second, 0.1 second, etc.), second sensor data 30b from the second sensor 26b over the series of time, and nth sensor data 30n from the nth sensor 26n over the series of time. The sensor data 30 from the plurality of sensors 26 can be stored, for example, using one or more data matrix 44 which includes data points over one or more time intervals. FIG. 1 illustrates an example of one such data matrix 44, in which a plurality of data points for the first sensor data 30a, the second sensor data 30b, and the nth sensor data 30n are shown over a time interval.

The central controller 14 can include one or more of a central processor 52, a central memory 54, and a data transmission device 56. The central processor 52 is configured to execute instructions programmed into and/or stored by the central memory 54, and many of the steps of the methods described herein can be stored as instructions in the central memory 54 and executed by the central processor 52.

The central memory 54 can include, for example, a non-transitory storage medium. The data transmission device 56 can include, for example, a transmitter and a receiver configured to send and receive wireless signals to and from the vehicle controller 22 in accordance with methods known in the art. For example, the data transmission device 56 can be configured for short-range wireless communication, such as Bluetooth communication, and/or for communication over a wireless network.

Figure 2:
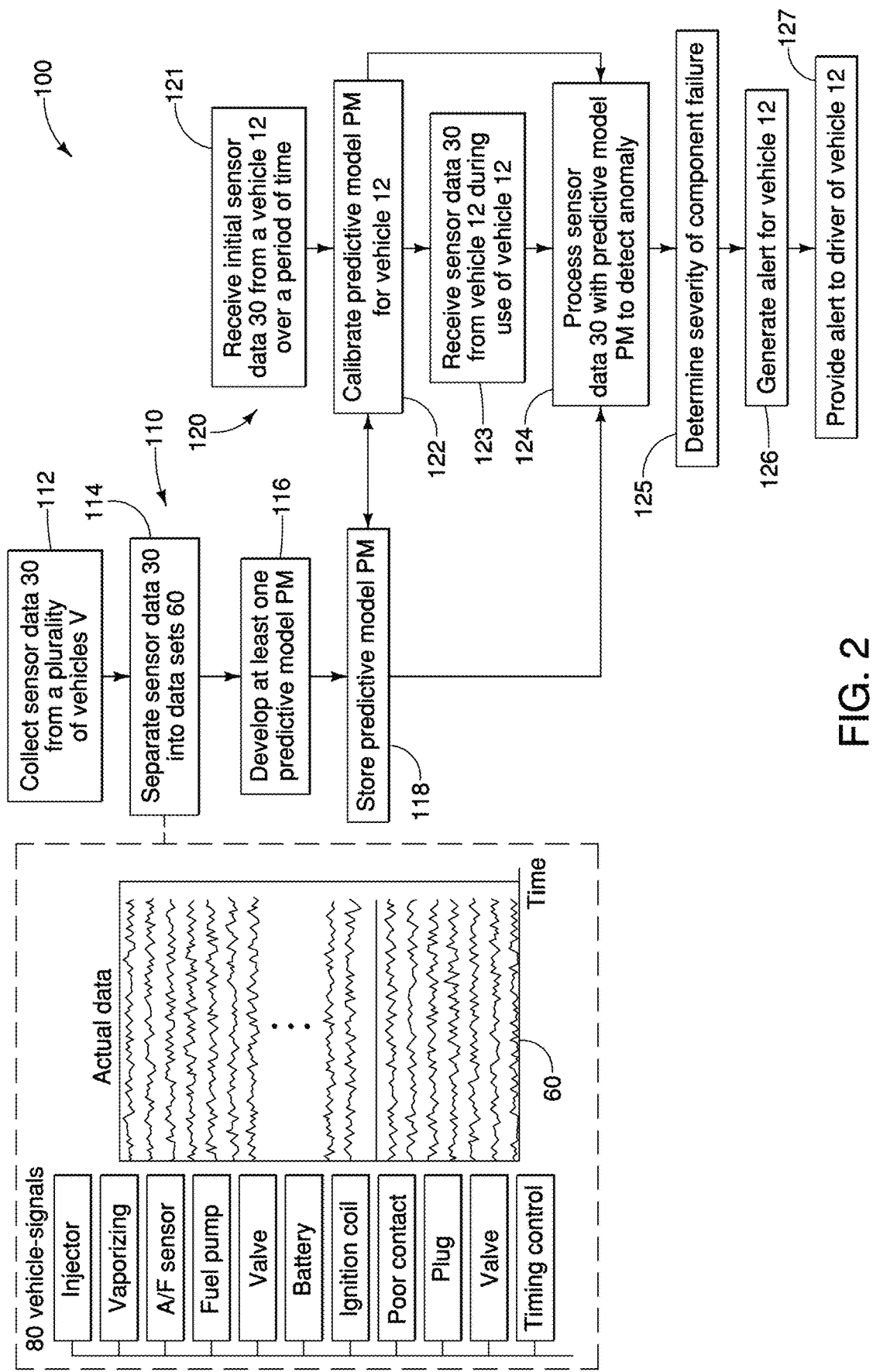
FIG. 2 illustrates an example embodiment of a method for predicting component failure in a vehicle and alerting a driver based thereon in accordance with the present disclosure.

FIG. 2 illustrates an example embodiment of a method 100 for predicting component failure in a vehicle 12 and alerting a driver. Some or all of the steps of method 100 can be stored as instructions on the vehicle memory 34 and/or the central memory 54 and can be executed by the vehicle processor 32 and/or the central processor 52 in accordance with the respective instructions stored on the vehicle memory 34 and/or the central memory 54. It should be understood from this disclosure that some of the steps described herein can be reordered or omitted without departing from the spirit or scope of method 100.

In FIG. 2, method 100 is divided into a first portion 110 and a second portion 120. The first portion 110 of the method 100 relates to the generation of a predictive model PM prior to implementation by a specific vehicle 12, and the second portion 120 of the method 100 relates to implementation using the specific vehicle 12. It should be understood from this disclosure that each of the first portion 110 and the second portion 120 can constitute independent methods, and that the first portion 110 and the second portion 120 are shown together in FIG. 2 for simplicity.

Referring first to the first portion 110 of the method 100, the first portion 110 relates to the generation of a generic predictive model PM using information from a plurality of vehicles V. Once generated, the predictive model PM can be applied by a plurality of vehicles 12. It should be understood from this disclosure that the vehicles 12 can be a subset of the vehicles V from which data is collected to create the generic predictive model PM (e.g., vehicle 12 can be a specific make and/or model of the vehicles V, a specific year of the vehicles V, a specific version of the vehicles V, etc.). The steps of the first portion 110 of the method 100 can be performed entirely by the central controller 14, or can be performed by the central controller 14 in combination with one or more vehicle controller 22.

At step 112, the central controller 14 collects sensor data 30 from a plurality of vehicles V. Each vehicle V can also be a vehicle 12. That is, the vehicles V can be the same or similar to the vehicle 12 for which the method 100 will eventually be applied (e.g., same make/model, same year, same version, etc.). Alternatively, the vehicle 12 can be among a subset of the vehicles V. Each vehicle V can include any or all of the components illustrated with respect to the vehicle 12 in FIG. 1.

The sensor data 30 from the vehicles V can include time-series data output from one or more sensor 26 over a period of time. Each period of time can be, for example, related to a trip made by the vehicle 12. As used herein, a "trip" can correspond, for example, to use of a vehicle V or vehicle 12 beginning at a first location and ending at a second location. In an embodiment, a plurality of trips can occur between an initial location and a destination location based on operating characteristics that vary between the initial location and the destination location. Thus, a "trip" can be defined by the operating characteristics of a vehicle V or vehicle 12 over a period of time. For each trip that a vehicle V or vehicle 12 takes, sensor data 30 can be collected and associated with one or more operating characteristic for the vehicle V or vehicle 12 during that trip. The operating characteristics can be determined by the central controller 14 or a vehicle controller 22 associated with each vehicle V and can include, for example, one or more of: (i) speed; (ii) acceleration; (iii) revolutions per minute; (iv) torque; (v) oil temperature; and (vi) number of braking or acceleration events.

At step 114, the central controller 14 can sort the sensor data 30 into a plurality of data sets 60. If the vehicle 12 is among a subset of the vehicles V for which sensor data 30 was collected, the sensor data 30 from vehicles V that are the same as or similar to the vehicle 12 can first be separated from that of other vehicles V. Then, in various embodiments, the sensor data 30 from similar vehicles V can be sorted by one or more of: (i) time period of collection; (ii) normal or abnormal operation of the vehicle during collection; and/or (iii) one or more operating characteristic sensed during collection.

In an embodiment, the data sets 60 can include normal data sets 60N for normal data and abnormal data sets 60A for abnormal data. The normal data can include, for example, sensor data 30 recorded by a vehicle V during a period of time that the vehicle V operated without any component failures. For example, the normal data can encompass periods of time that fall between manufacture of the vehicle V and a predetermined period of time before any component failure occurred. The abnormal data can include, for example, sensor data 30 recorded by a vehicle V during a period of time leading up to a confirmed component failure. The beginning of the abnormal period of time can be, for example, a time when sensor data 30 from one or more sensor 26 began to deviate leading up to a confirmed component failure. Alternatively, the beginning of the abnormal period of time can be a predetermined amount of time prior to a confirmed component failure.

In an embodiment, the data sets 60 can include characteristic data sets 60C which separate the sensor data 30 by one or more operating characteristic. The characteristic data sets 60C can be a subgroup of the normal data sets 60N and/or abnormal data sets 60A, such that the central controller 14 sorts the sensor data 30 into normal data sets 60N and abnormal data sets 60A which are each associated one or more operating characteristic. The operating characteristic can be any variable characteristic experienced by the vehicle V during a trip. In an embodiment, the characteristic data sets 60C can separate the sensor data 30 based on correspondence with a value or range of at least one of: (i) trip speed; (ii) acceleration; (iii) revolutions per minute; (iv) torque; (v) oil temperature; and/or (vi) number of braking or acceleration events. For example, an operating characteristic can include one or more of: (i) an average speed of the vehicle V experienced during a trip; (ii) an average acceleration of the vehicle V experienced during a trip; (iii) an average revolutions per minute experienced by the vehicle V during a trip; (iv) an average torque experienced by the vehicle V during a trip; (v) an average oil temperature experienced by the vehicle V during a trip; and/or (vi) an average number of braking or acceleration events experienced by the vehicle V during a trip. Thus, for example, normal data sets 60N can be sorted into separate characteristic data sets 60C relating to ranges of average speed (e.g., a first data set 60a for trips with an average speed between 1 to 20 mph, a second data set 60b for trips with an average speed of 20 to 40 mph, etc.). In another example, normal data sets 60N can be sorted into separate characteristic data sets 60C relating specific average speeds (e.g., a first data set 60a of sensor data 30 recorded during an average speed of 10 mph, a second data set 60b of sensor data 30 recorded during an average speed of 20 mph, etc.).

Each data set 60, regardless of the particular thresholds for sorting, can include sensor data 30 from a plurality of sensors 26 taken over a period of time. FIG. 2 at step 114 illustrates an example embodiment of a data set 60 which includes sensor data 30 from a plurality of sensors 26 over a specified time interval (e.g., for a trip). Here, the data set 60 includes sensor data 30 from each of eighty (80) sensors 26 over the same time interval. In other words, the data set 60 includes time-series sets of sensor data 30 for each of a plurality of sensors 26. The data set 60 shown in FIG. 2 could be, for example, the first data set 60a or the second data set 60b discussed in the previous paragraph. The data set 60 shown in FIG. 2 could also be, for example, a normal data set 60N, an abnormal data set 60A, or a characteristic data set 60C.

At step 116, the central controller 14 develops one or more predictive model PM using the data sets 60. In developing the predictive model PM, the central controller 14 trains the predictive model PM to detect one or more anomaly in a vehicle 12 using the time-series data from a plurality of similar vehicles V. In an embodiment, a separate predictive model PM can be developed for each of a plurality of data sets 60. For example, a first predictive model PM1 can be developed for a first operating characteristic, a second predictive model PM2 can be developed for a second operating characteristic, etc. As described in more detail below, developing the one or more predictive model PM can also include determining one or more threshold which indicates an upcoming component failure and/or a severity of the component failure.

In an embodiment, the one or more predictive model PM can include one or more neural network, and developing the one or more predictive model PM can include training the one or more neural network using the data sets 60. Training the neural network can include using data sets 60 related to normal data to train the neural network how to view sensor data 30 when a vehicle component is working properly. Training the neural network can further include using data sets 60 related to abnormal data to train the neural network how to view sensor data 30 when a specific vehicle component is approaching failure. Training the neural network can further include using data sets 60 related to different vehicle operating characteristics to train the neural network to determine a severity of the upcoming component failure based on at least one operating characteristic of the vehicle. In other words, training the neural network can include determining how different operating characteristics contribute to (e.g. slow down or hasten) a component failure.

One or more predictive model PM can be trained, for example, using the normal data sets 60 as inputs for normal behavior by a vehicle 12. In an embodiment, numerical values taken directly from the data sets 60 can be used as an input for the predictive model PM. In another embodiment, values or equations calculated from the data sets 60 can be used as an input for the predictive model PM. In another embodiment, images or graphs created from the data sets 60 can be used as an input for the predictive model PM. Various embodiments which determine correlations or distribution statistics or create images or graphs from the data sets 60 are discussed in more detail below.

Figure 6:
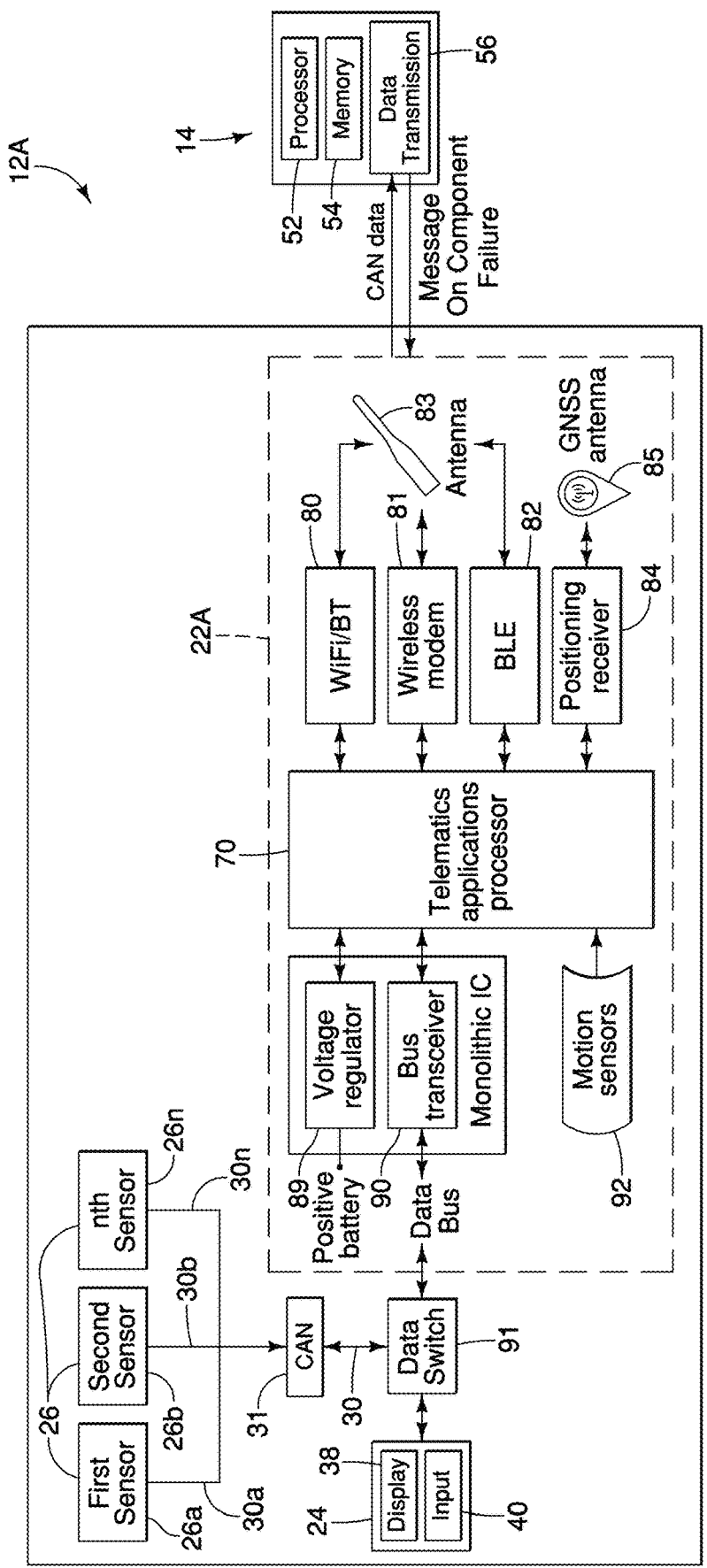
FIG. 6 is a schematic diagram of an example embodiment of a processing arrangement for the system of FIG. 1.
Figure 7:
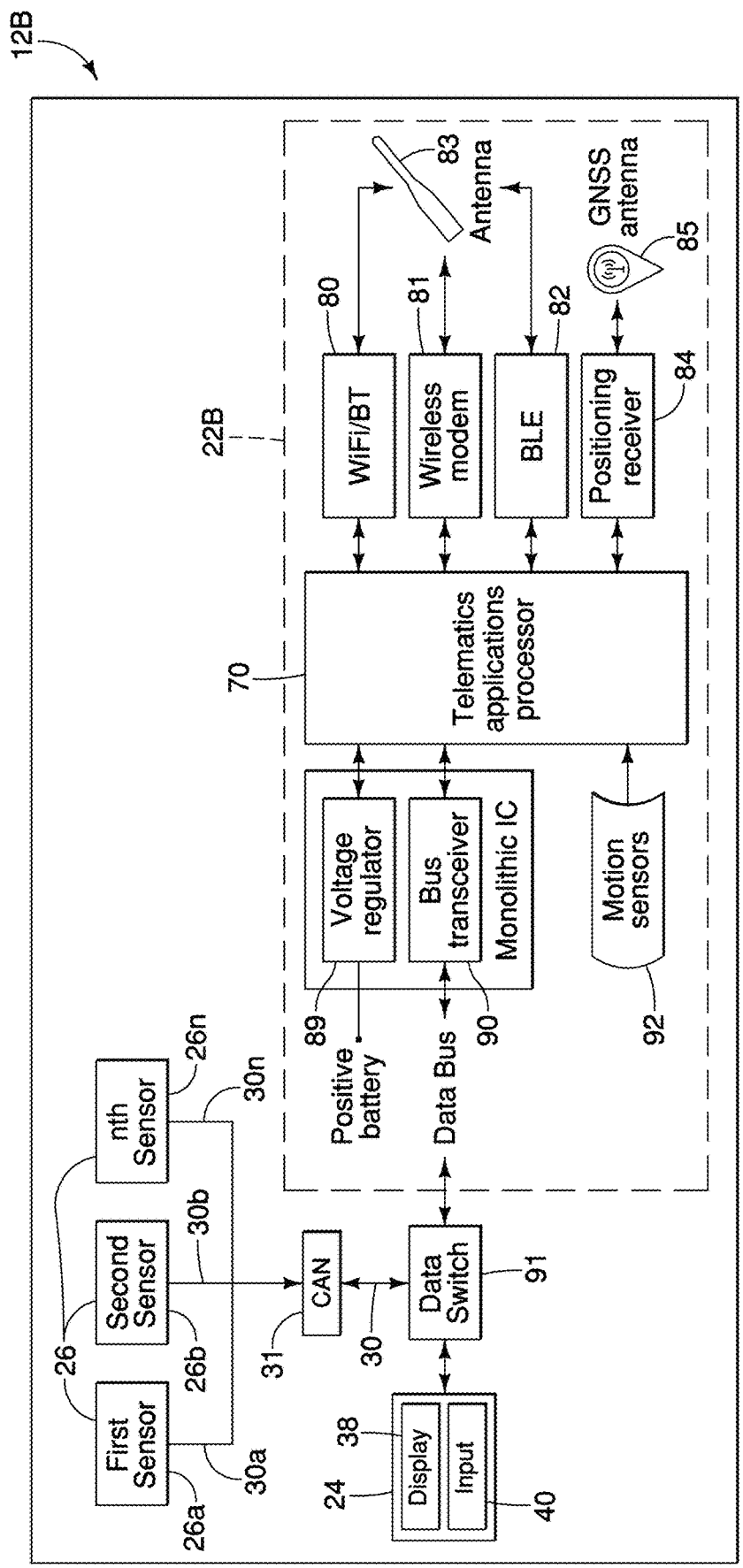
FIG. 7 is a schematic diagram of another example embodiment of a processing arrangement for the system of FIG. 1.
Figure 8:
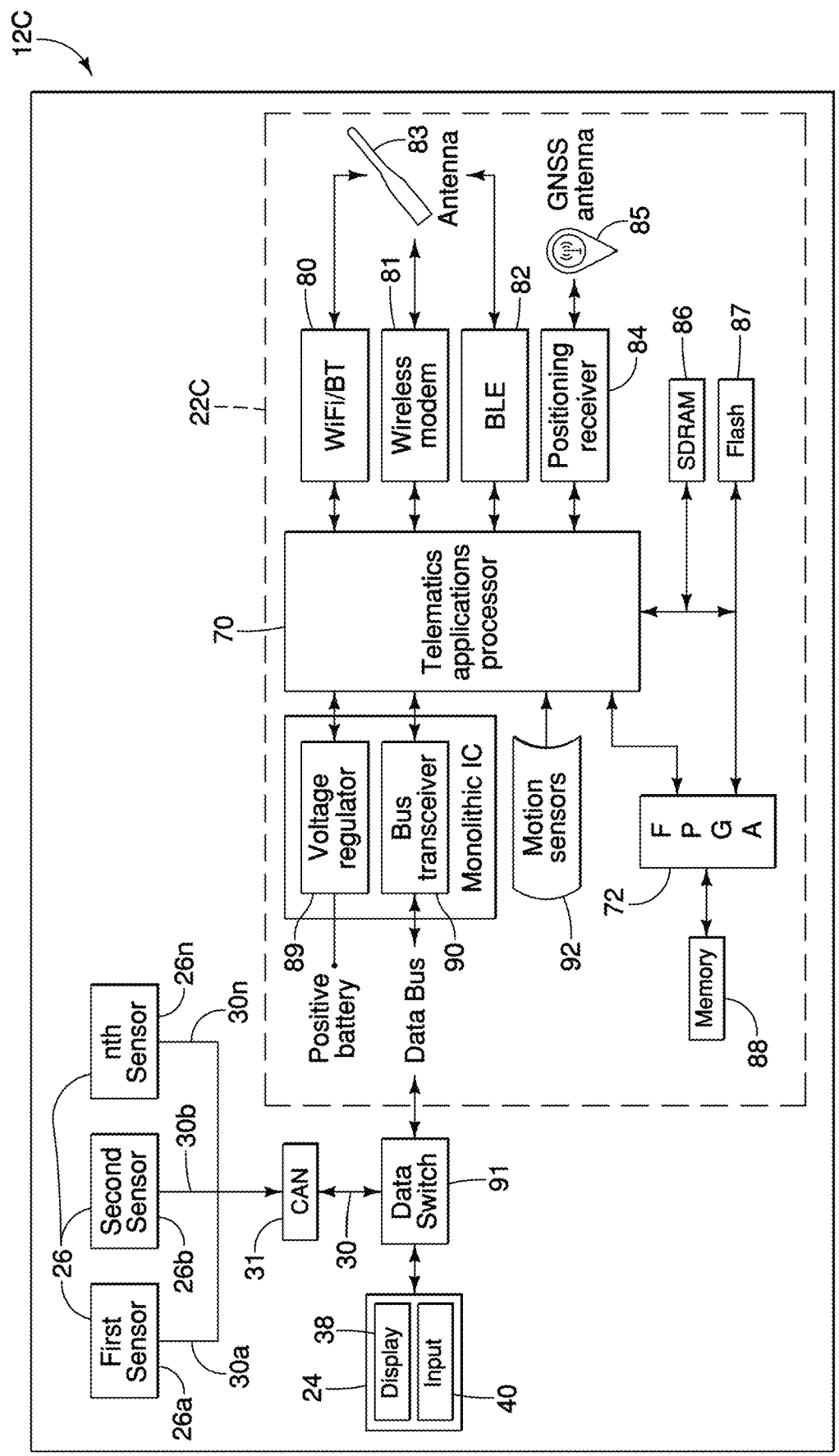
FIG. 8 is a schematic diagram of yet another example embodiment of a processing arrangement for the system of FIG. 1.
Figure 9:
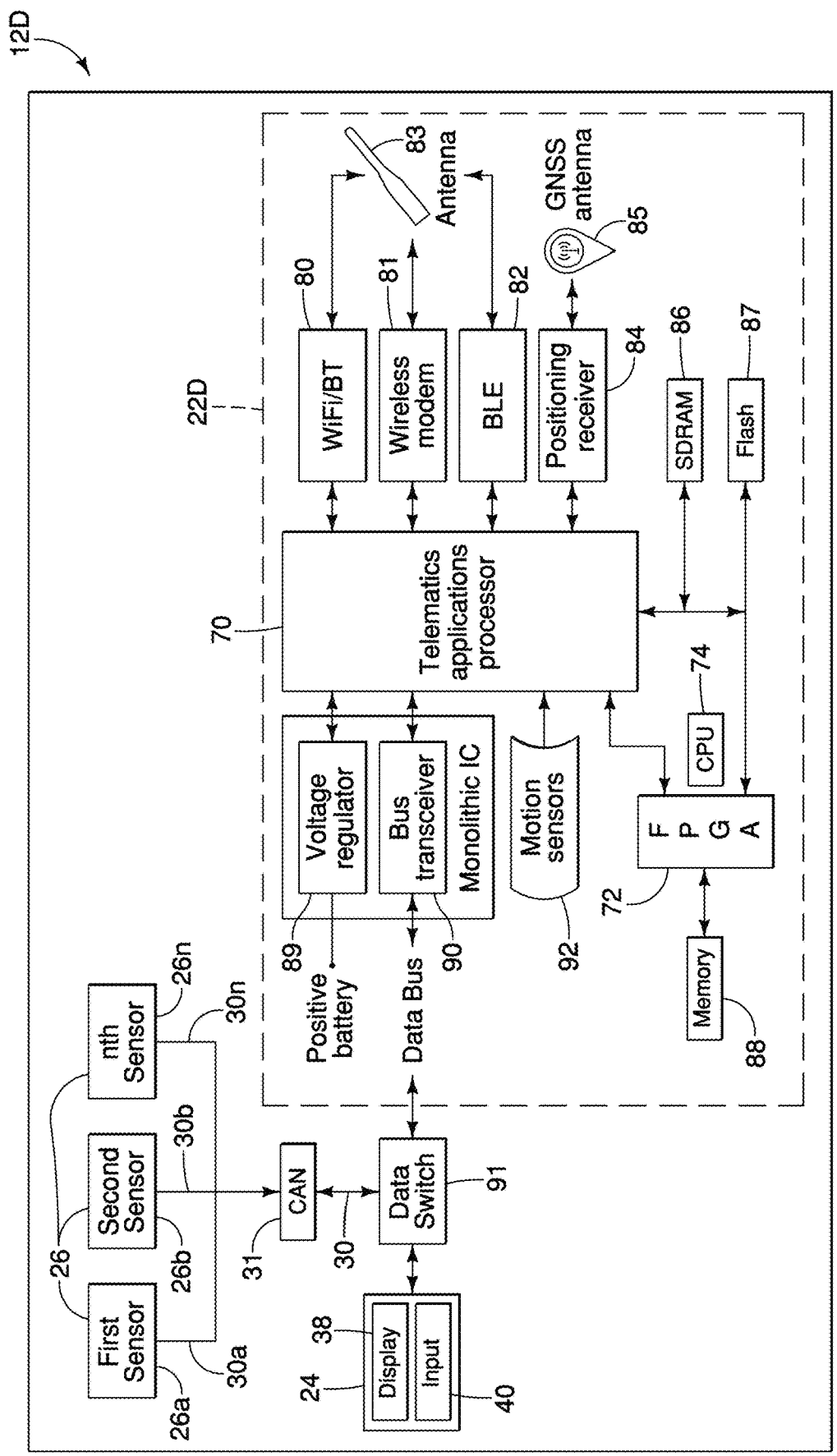
FIG. 9 is a schematic diagram of still another example embodiment of a processing arrangement for the system of FIG. 1.

At step 118, the predictive model PM is stored for later use by individual vehicles 12. In one embodiment, the central controller 14 can store one or more predictive model PM using the central memory 54 (e.g., as seen in FIG. 6). In another embodiment, the central server 14 can transmit one or more predictive model PM to the vehicle controller 22 of each vehicle 12, such that one or more predictive model PM is stored by the vehicle 12 using the vehicle memory 34 (e.g., as seen in FIGS. 7 to 9). Alternatively, one or more predictive model PM can be stored by another memory separate from the vehicle memory 34 or the central memory 54, wherein the separate memory is thereafter placed in communication with the central controller 14 or the vehicle controller 22 for further use of the predictive model PM as discussed herein.

Referring next to the second portion 120 of the method 100, the second portion 120 relates to implementation of the predictive model PM using a specific vehicle 12. The steps of the second portion 120 of method 100 can be performed by the vehicle controller 22 after storing the predictive model PM using the vehicle memory 34. Alternatively, the steps of the second portion 120 of method 100 can be performed by a combination of the central controller 14 and the vehicle controller 22. Various example embodiments of the structure for implementing the second portion 120 of the method 100 are illustrated by FIGS. 6 to 9.

At step 121, the central controller 14 and/or the vehicle controller 22 receives initial sensor data 30 from a vehicle 12. The initial sensor data 30 can include the same type of sensor data 30 used to develop the predictive model PM at step 116 (e.g., can be sorted into data sets 60 which correspond to the data sets 60 used at step 116). Step 121 can be performed, for example, when the vehicle 12 is first manufactured and all of its components are operating in normal working condition. For example, step 121 can be performed before the vehicle 12 is shipped after manufacture and/or over a predetermined distance first driven by the vehicle 12 (e.g., the first of a predetermined number of miles/kilometers driven by the vehicle 12). Here, the initial sensor data 30 is intended to provide a normal operation baseline to calibrate the predictive model PM for later use by the specific vehicle 12.

At step 122, the predictive model PM can be calibrated for the vehicle 12. The calibration is performed so that the predictive model PM is accurate for the vehicle 12. In an embodiment, the predictive model PM can be for a group of similar vehicles V, and the calibration can apply the predictive model PM to a specific vehicle 12 within that group. Even amongst the same type of vehicles 12, each distinct vehicle 12 can include sensors 26 with slightly different sensitivities or features, making calibration for a specific vehicle 12 still desirable in certain cases even when the predictive model PM is already trained for the same type as the vehicle 12. Thus, even if the predictive model PM is already pre-calibrated for a make and model that is the same as the vehicle 12, it can be helpful to calibrate each predictive model PM for each specific vehicle 12 for later use. In an embodiment, the central controller 14 or the vehicle controller 22 can calibrate the predictive model PM by applying weights to inputs into the predictive model PM which are based on the sensor data 30 from the vehicle 12. Alternatively, the central controller 14 or the vehicle controller 22 can apply the weights to values stored within the predictive model PM so as to fit the predictive model PM to the sensor data 30 generated by the vehicle 12.

The calibrated predictive model PM can be stored for later use by the vehicle 12. In one embodiment, the central controller 14 can store the calibrated predictive model PM using the central memory 54 (e.g., as seen in FIG. 6). In another embodiment, the vehicle controller 14 can store the calibrated predictive model PM using the vehicle memory 34 (e.g., as seen in FIGS. 7 to 9). In another embodiment, the calibrated predictive model PM can be stored by another memory separate from the vehicle memory 34 or the central memory 54, wherein the separate memory is thereafter placed in communication with the central controller 14 or the vehicle controller 22 for further use of the calibrated predictive model PM as discussed herein.

At step 123, the central controller 14 and/or the vehicle controller 22 receives sensor data 30 from at least one vehicle sensor 26 of the vehicle 12 over a period of time. For example, the sensor data 30 can be generated during regular use of the vehicle 12 for day-to-day activities. In an embodiment, step 123 can be continuously performed by the vehicle controller 22 at all times when the vehicle 12 is in use. In this way, the second portion 120 of method 100 is continuously performed over the life of the vehicle 12 so that component failures are predicted at most or all times during use of the vehicle 12 by the owner.

In an embodiment, the vehicle memory 34 can store the operating characteristics recorded during collection of the sensor data 30 as historical operating characteristics. These historical operating characteristics can optionally be accessed later to estimate the urgency of a component failure based on how the vehicle 12 is typically driven by the owner.

At step 124, the central controller 14 and/or the vehicle controller 22 processes the sensor data 30 using one or more predictive model PM to detect an anomaly indicative of an upcoming component failure for the vehicle 12. The one or more predictive model PM can include the calibrated predictive model PM from step 122. In processing the sensor data 30, at least one of the central controller 14 or the vehicle controller 22 can sort the sensor data into various data sets 60 and process the data sets 60. The data sets 60 can be of the same type used to develop the predictive model PM at step 116 and/or of the same type used to calibrate the predictive model at step 122. For example, the data sets 60 can include characteristic data sets 60C divided according to one or more operating characteristic such as: (i) average trip speed of the vehicle V experienced during a trip; (ii) average acceleration of the vehicle experienced during a trip; (iii) average revolutions per minute experienced by the vehicle during a trip; (iv) average torque experienced by the vehicle during a trip; (v) average oil temperature experienced by the vehicle during a trip; or (vi) average number of braking or acceleration events experienced by the vehicle during a trip. The predicted component failure can relate to any vehicle component being rendered in a state that it cannot effectively function as desired (e.g., a dead battery, a failed plug or valve, an issue with the transmission, a nonfunctioning sensor, a faulty ignition coil, etc.).

An anomaly can be determined, for example, when one or more threshold determined using the predictive model PM is crossed, e.g., by the sensor data 30 generated during step 124 or other values based thereon. Several examples of thresholds are discussed in more detail below. In various embodiments, the thresholds for determining an anomaly can be determined at step 116 when the predictive model PM is developed and/or at step 122 when the predictive model PM is calibrated for the vehicle 12. In an embodiment, each operating characteristic or groups of operating characteristics can have different thresholds for anomaly detection. Thus, a predictive model PM for a first set of operating characteristics can have a different threshold than a predictive model PM for a second set of operating characteristics. In another embodiment, multiple thresholds can be determined during step 116 and/or step 122, with each of the multiple thresholds relating to a severity of component failure and/or one or more operating characteristic associated with the vehicle 12.

At step 125, the central controller 14 and/or the vehicle controller 22 determines the severity of the upcoming component failure based on the output from the predictive model PM. The severity of the upcoming component failure can include one or more of: (i) the likelihood of the upcoming component failure; (ii) the expected time or distance remaining until the upcoming component failure (e.g., expected hours/days remaining or an expected number of miles/kilometers driven until failure); and/or (iii) the impact of the upcoming component failure on the operation of the vehicle 12 (e.g., is the component a major or minor component, can the vehicle 12 continue to operate after the component failure, can the component failure cause additional damage to other components, etc.).

In an embodiment, the severity of the upcoming component failure can be determined by the threshold that has been crossed using the predictive model PM. For example, the severity can be determined based on the magnitude of how far a threshold has been crossed. In another example, the predictive model PM can include multiple thresholds (e.g., a first threshold indicating the vehicle can drive 50 miles until the component failure, a second threshold indicating that the vehicle can drive 25 miles until the component failure, etc.)

In an embodiment, which can utilize a single threshold or multiple thresholds, the severity can be based on at least operating characteristic of the vehicle. For example, by dividing data sets into characteristic data sets 60C, one or more threshold for severity can be associated with different operating characteristics, and the specific operating characteristics used by the vehicle 12 during collection of sensor data 30 can be considered when processing the sensor data using the predictive model. Thus, in an embodiment, the central controller 14 and/or the vehicle controller 22 can determine severity based on the operating characteristics of the vehicle 12, for example, by dividing the data sets 60 according to operating characteristics and separately processing the data sets 60 using one or more predictive model PM.

In an embodiment, basing the severity on an operating characteristic can include use of at least one historical operating characteristic of the vehicle 12 stored by the vehicle memory 34 at step 123. The historical operating characteristics can depend on past driving habits of one or more driver of the vehicle 12. That is, the severity of a predicted component failure can be estimated based on how the vehicle 12 is typically driven. For example, faster driving or more breaking during use of the vehicle 12 can accelerate certain component failures. Thus, the central controller 14 and/or the vehicle controller 22 can determine severity based on the historical operating characteristics of the vehicle 12, for example, by considering the historical operating characteristics experienced most frequently by the vehicle 12 during use, and by considering how those operating characteristics will accelerate the component failure in the future if the driver continues to drive the vehicle according to the same patterns. For example, the central controller 14 and/or the vehicle controller 22 can predict identical anomalies for two vehicles using the predictive model PM, but then predict one vehicle's component failure will occur sooner due to how that vehicle's historical operating characteristics.

In an embodiment, the central controller 14 and/or the vehicle controller 22 can determine the severity of the upcoming component failure by calculating an estimated time or distance remaining until the upcoming component failure. The calculation of the estimated time or distance can be based on at least one operating characteristic of the vehicle. The operating characteristic can include a real-time or a historical operating characteristic. The estimated time or distance remaining can be calculated, for example, by the predictive model PM knowing how the vehicle 12 is operated in the past and/or by predicting that the vehicle 12 will operate in the same way in the future. In an embodiment, the estimated time or distance remaining can be calculated, for example, by determining that an anomaly exists using the predictive model, and by then considering how quickly the component failure will occur based on past data, one or more additional physics-based model, and/or future predictions using the operating characteristics. In another embodiment, the estimated time or distance remaining can be calculated by dividing the data sets 60 into characteristic data sets 60C during step 124, and then processing the characteristic data sets 60C using predictive models PM which have been developed for similar characteristic data sets 60C based on other vehicles V which experienced similar operating characteristics.

In an embodiment, an output of the predictive model PM can be used with one or more additional physics-based model to determine the severity of the upcoming component failure. For example, an additional physics-based model can include a chart which predicts the severity of the upcoming component failure based on the particular anomaly detected by the predictive model PM, one or more threshold of the predictive model PM being crossed for a period of time, and/or the magnitude of how far a threshold has been crossed. The additional physics-based model can be developed, for example, using abnormal data sets 60A for abnormal data from similar vehicles V.

At step 126, the central controller 14 and/or the vehicle controller 22 generates an alert regarding the upcoming component failure determined using the predictive model PM. The alert can include an indication of the severity of the upcoming component failure as determined at step 125. The indication of the severity can include, for example, one or more of: (i) the likelihood of the upcoming component failure; (ii) the expected time or distance remaining until the upcoming component failure; and/or (iii) the impact of the upcoming component failure on the operation of the vehicle 12.

In an embodiment, the central controller 14 and/or the vehicle controller 22 can utilize the navigation system 28 and/or GPS device 42 to generate the alert. Here, depending on the severity of the component failure, the central controller 14 or the vehicle controller 22 can determine the distance that the vehicle 12 can continue to drive until the component failure occurs. Based on the location of the vehicle 12 as determined using the GPS device 42, the central controller 14 and/or the vehicle controller 22 can locate repair shops (e.g., car dealerships, third party repair shops, etc.) within that distance and use the navigation system 28 to route the vehicle 12 to a repair shop that can fix the component failure before it occurs. For example, if a component failure will occur in five (5) miles, then the central controller 14 and/or the vehicle controller 22 can find a repair shop within five (5) miles and cause the navigation system 28 to route the vehicle 12 to that location. In this way, the systems and methods discussed herein can help fix a problem before it becomes more expensive.

At step 127, the central controller 14 and/or the vehicle controller 22 causes the alert regarding the upcoming component failure to be provided to the driver of the vehicle 12. Here, the vehicle controller 22 can cause the alert to be displayed on the display 38 of the user interface 24. The vehicle controller 22 can also cause the alert to be provided to the driver by other methods, for example, by an audio signal. Additionally or alternatively, at least one of the central controller 14 or the vehicle controller 22 can cause the alert to be sent to the personal electronic device (e.g., phone, tablet, personal computer, etc.) of the owner of the vehicle 12, thus alerting the owner even if the owner is not in the vehicle at that time.

When the alert is provided to the driver of the vehicle, the alert can include a notification of the severity of the upcoming component failure. In an embodiment, the alert can indicate the severity by altering the display 38 based on the severity. The severity can be indicated, for example, by altering a font color or size of the alert on the display 38 and/or by altering the type of message on the display 38. The severity can also be indicated, for example, by notifying the driver of one or more of: (i) the likelihood of the upcoming component failure; (ii) the time or distance remaining until the upcoming component failure; and/or (iii) the impact of the upcoming component failure on the operation of the vehicle 12 (e.g., whether the vehicle 12 can continue to operate after the component failure). The severity can also be indicated, for example, by instructing the driver to proceed to a repair shop as discussed above.

Figure 3:
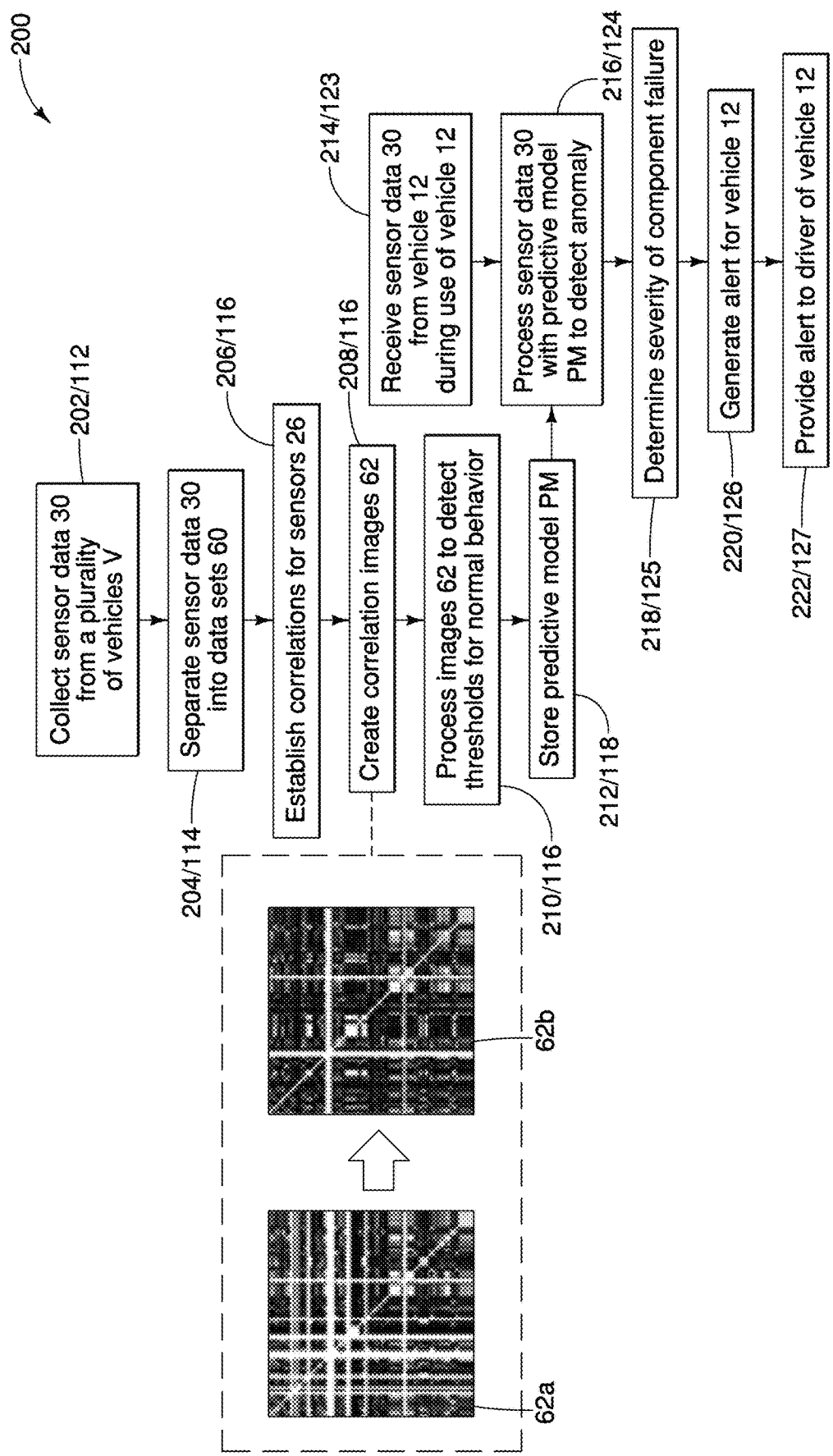
FIG. 3 illustrates an example embodiment of the method of FIG. 2.
Figure 4:
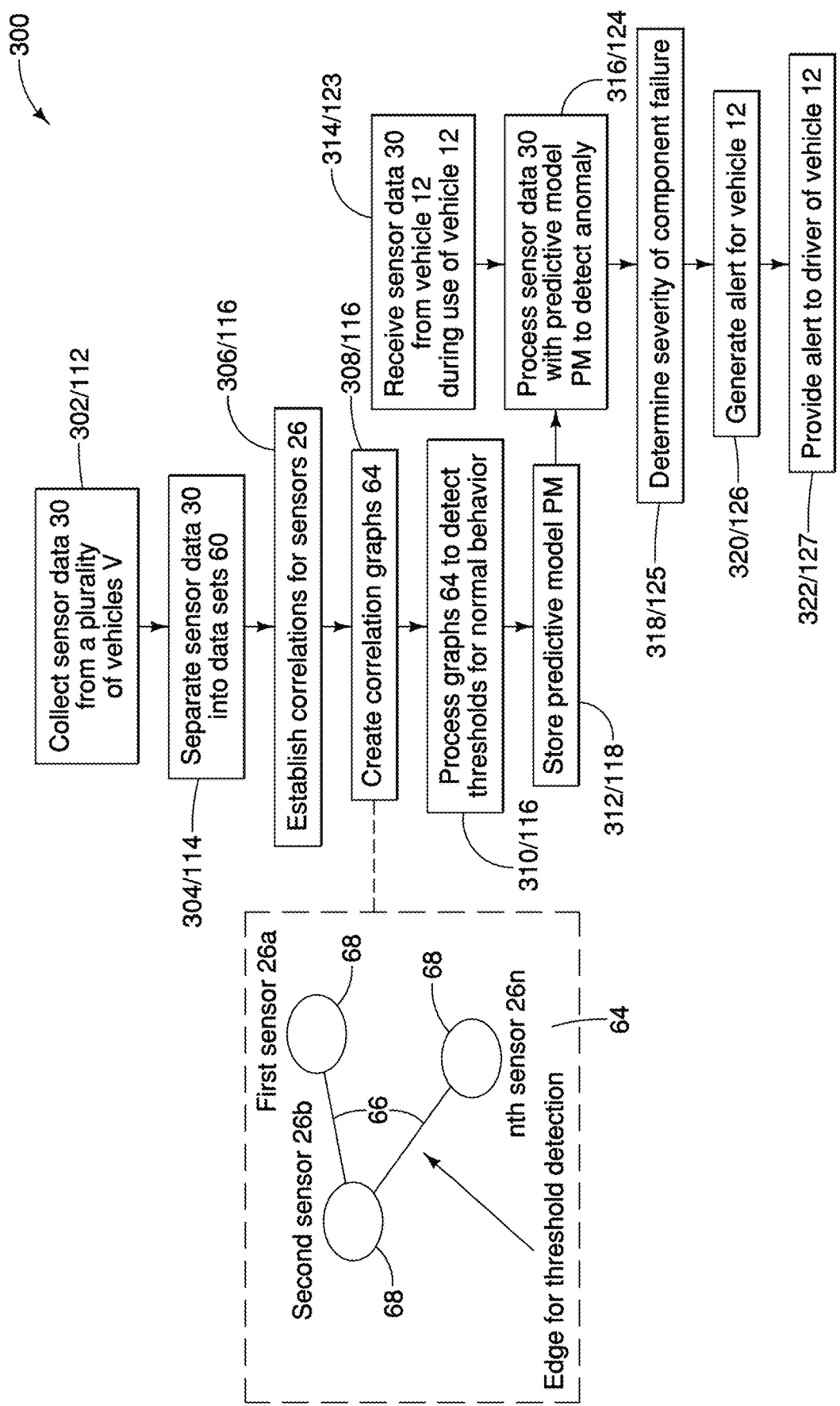
FIG. 4 illustrates another example embodiment of the method of FIG. 2.
Figure 5:
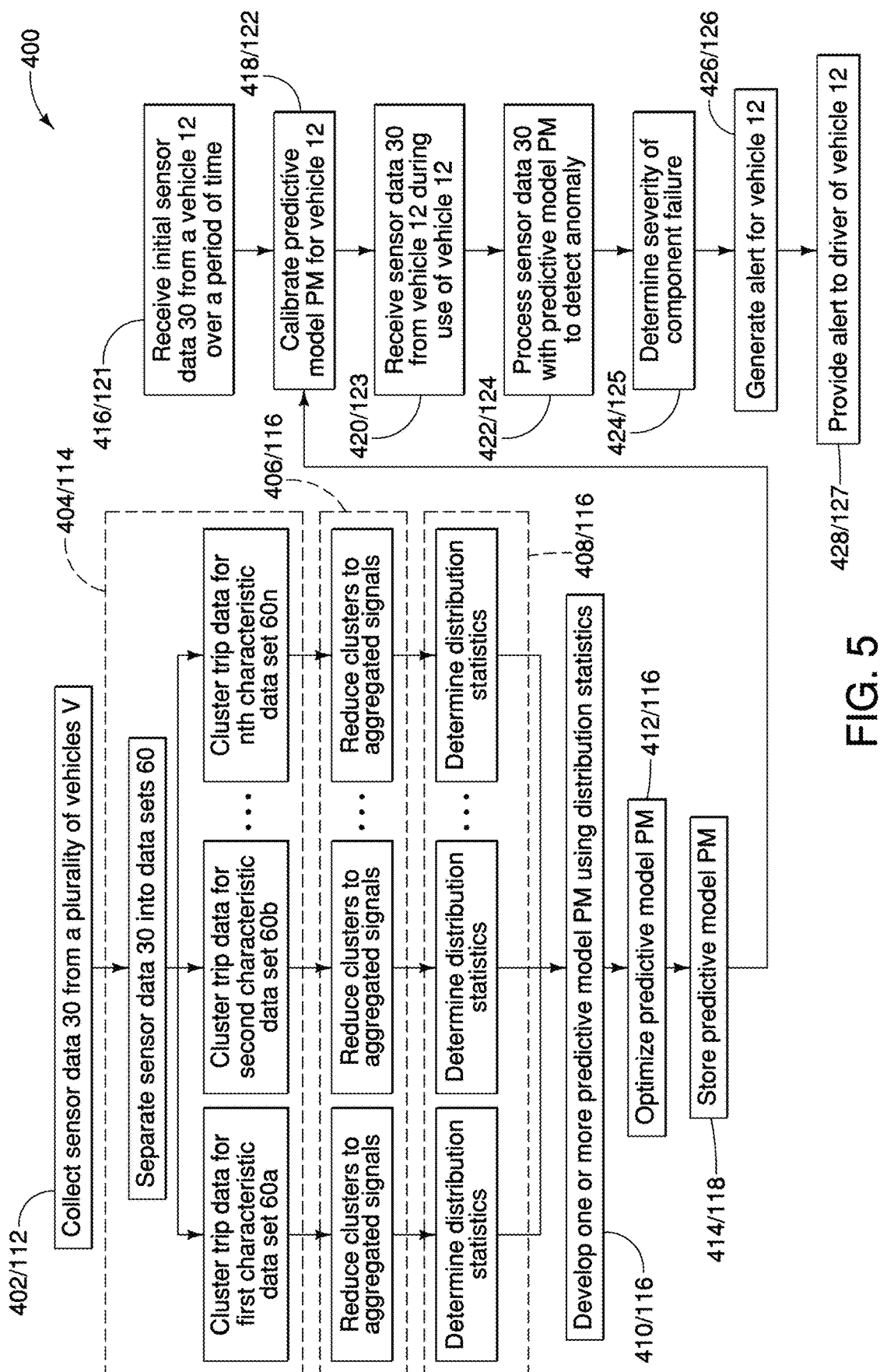
FIG. 5 illustrates yet another example embodiment of the method of FIG. 2.

FIGS. 3 to 5 illustrate more detailed example embodiments of the method 100 of FIG. 2. In each of FIGS. 3 to 5, the reference numerals from method 100 have been used to show correspondence with the steps of method 100. It should be understood from this disclosure that method 100 can include one or more of the steps of method 200, method 300 and/or method 400, alone or in combination, without departing from the spirit and scope of the present disclosure. It should further be understood from this disclosure that method 200, method 300 and method 400 are example implementations of method 100 and do not limit method 100 to the implementations described.

FIG. 3 illustrates a first example embodiment of a method 200 for predicting component failure in a vehicle 12 and alerting a driver. Some or all of the steps of method 200 can be stored as instructions on the vehicle memory 34 and/or the central memory 54 and can be executed by the vehicle processor 32 and/or the central processor 52 in accordance with the respective instructions stored on the vehicle memory 34 and/or the central memory 54. It should be understood from this disclosure that some of the steps described herein can be reordered or omitted without departing from the spirit or scope of method 200.

At step 202, the central controller 14 collects sensor data 30 from a plurality of vehicles V. The vehicles V can be the same or a similar make and/or model as the vehicle 12 for which the method 200 will be applied. Alternatively, the vehicle 12 can be among a subset of the vehicles V. For each trip that a vehicle V takes, sensor data 30 can be collected and associated with one or more operating characteristic for that trip.

At step 204, the central controller 14 can sort the sensor data 30 into a plurality of data sets 60. If the vehicle 12 is among a subset of the vehicles V for which sensor data 30 was collected, the sensor data 30 from vehicles V the same as or similar to the vehicle 12 can first be separated. Then, in various embodiments, the sensor data 30 from similar vehicles V can be sorted by one or more of: (i) time period of collection; (ii) normal or abnormal operation of the vehicle during collection; and (iii) one or more operating characteristic sensed during collection. These various embodiments are explained in more detail above with respect to step 114 of method 100.

At step 206, the central controller 14 can develop covariance data using the sensor data 30 generated during normal operation of a vehicle V (e.g., using normal data sets 60N). In developing the covariance data, the central controller 14 can establish whether a correlation exists between multiple pairs of sensor data 30 during normal operation of a vehicle V. For example, the central controller 14 can establish whether a correlation exists between pairs for sensors 26 for each normal data set 60N. In an embodiment, the correlation can be a YES or NO correlation (e.g., either a correlation exists or does not exist between a pair of sensors 26 within a data set 60). Whether or not a correlation exists between a pair of sensors 26 can be determined according to a similar pattern over a time interval and/or according to a predetermined threshold for change. In an embodiment, a degree of correlation can also be considered.

At step 208, the central server 14 can create a plurality of images 62 based on the sensor data 30 from the data sets 60. In an embodiment, the images 62 can include the covariance data from step 206, such that each image 62 represents a plurality of correlations between pairs of sensors 26 for a specific time interval and/or for a data set 60. For example, a first image 62a can relate to whether a plurality of correlations did or did not occur over a first time period, a second image 62b can relate whether a plurality of correlations did or did not occur over a second time period, etc. FIG. 3 at step 208 illustrates an example embodiment of such images 62, wherein a first image 62a captures correlation data for a first time period, and a second image 62b captures correlation data for a second time period. In an embodiment, the first time period can be that of a first data set 60a, and the second time period can be that of a second data set 60b. The images 62a, 62b shown in FIG. 3 include covariance plots (here, each image includes an 80×80 covariance plot for the example of eighty (80) sensors 26 discussed above). Each pixel in the image 62 represents either a correlation or no correlation between two sensors 26, with a black pixel indicating no correlation (e.g., black=0) and a white pixel indicating a correlation (e.g., white=1). In an embodiment, the image 62 can be a data matrix of correlations (e.g., a matrix of 0's and 1's).

At step 210, the central server 14 can process the images 62 to generate and/or train a predictive model PM. The central server 14 can process the images 62, for example, by performing an image change detection algorithm using a plurality of the images 62. Using the image change detection algorithm, the central server 14 can determine a normal amount of changes in the images 62 over a period of time (e.g., the number of pixels which change over a period of time, the location of correlations which change over a period of time, etc.). Using this information, the central server 14 can determine a threshold for change that the sensors 26 experience during periods of normal operation, such that changes within the threshold should not raise any alarms or indicate an anomaly. In an embodiment, the central server 14 can separately process images 62 for characteristic data sets 60C related to different operating characteristics to determine different thresholds for change depending on the operating characteristics. In an embodiment, the central server 14 can also process the abnormal data sets 60A to determine thresholds and/or image patterns related to various vehicle component failures, for example, which occur during various operating conditions.

In an embodiment, the predictive model PM includes a neural network configured to analyze the images 62 for likeness. For example, the neural network can be trained to recognize differences in pixels or groups of pixels in various images 62. The neural network can further be trained to distinguish normal data from abnormal data based on the differences in pixels or groups of pixels between normal data sets 60N and abnormal data sets 60A. Thus, the neural network can be trained, using similar images 62 that led to specific component failures in a vehicle V, to predict a specific upcoming component failure in the vehicle 12 for which the method 200 is applied. The neural network can further be trained to use characteristic data sets 60C to predict upcoming vehicle failure depending on the operating characteristics experienced by the vehicle 12, for example, due to the driving style of the driver.

In an embodiment, the threshold for detection of an anomaly can be determined based on clusters of pixels within the images 62. For example, clusters can be defined for sets of covariance values. A cluster number can be assigned to each pixel. Then, the change of the cluster number per pixel can be counted to determine the threshold for determining an anomaly and/or the severity of an upcoming component failure when processing future images 62 using the predictive model PM. It should be understood from this disclosure that the thresholds can differ for different vehicles 12, different vehicle components within a vehicle 12, and/or different operating characteristics for the vehicle 12.

At step 212, the predictive model PM is stored. The predictive model PM can include a neural network that has been trained using the images 62 at step 210. The predictive model can be stored, for example, using the vehicle memory 34 or the central memory 54.

At step 214, a vehicle 12 begins to generate sensor data 30. In an embodiment, initial sensor data 30 generated by the sensors 26 of the vehicle 12 can be used to calibrate the predictive model PM as discussed above with respect to steps 121 and 122 of method 100 (not shown in FIG. 3). Alternatively, the predictive model PM can be generic to the vehicle 12 and require no further calibration. If the predictive model PM is stored by the central memory 54, then the vehicle controller 14 can transmit the sensor data 30 to the central controller 14 regularly or at intervals. Alternatively, the predictive model PM can be transferred from the central memory 54 to the vehicle memory 34 and stored thereon.

At step 216, either the central controller 14 or the vehicle controller 22 processes the sensor data 30 from the vehicle 12 using the predictive model PM. The data can be processed in the same way as discussed above with respect to steps 204 to 210. That is, the sensor data 30 can be separated into data sets 60, correlations between pairs of sensors 26 in the data sets 60 can be determined, and/or the correlations can be used to create real-time images 62 representative of the real-time sensor data 30 from the vehicle 12. The predictive model PM can then determine how the real-time images 62 change over time, determine the magnitude of changes in the real-time images 62 (e.g., by counting the changes in pixels and/or clusters within the real-time images 62), and/or determine whether the magnitude of changes crosses the threshold for normal behavior as determined at step 210.

In one embodiment, either the central controller 14 or the vehicle controller 22 can use the predictive model PM to determine whether the correlations from the real-time images 62 fall within the thresholds for normal behavior. For example, the predictive model PM can determine whether a magnitude of change in the real-time images 62 crosses the threshold for normal behavior over a period of time as determined at step 210. If the threshold for normal behavior has been crossed over a period of time, then the predictive model PM has detected an anomaly and can predict that an upcoming vehicle component failure will occur.

In another embodiment, either the central controller 14 or the vehicle controller 22 can use the predictive model PM to determine the magnitude of how far the change in the real-time images 62 crossed the threshold for normal behavior over a period of time, or to determine that a plurality of thresholds have been crossed. Depending on the outcome, the magnitude of the difference determined by the predictive model PM can be used, for example, with an additional physics-based model to determine the severity of the upcoming vehicle component failure.

In another embodiment, either the central controller 14 or the vehicle controller 22 can use the predictive model PM to determine which vehicle component will fail based on likeness with abnormal data sets 60A used in training at step 210. For example, a neural network can be trained with images 62 generated from abnormal data sets 60A, and can therefore determine whether the real-time images 62 from the vehicle 12 are more similar to images 62 related to abnormal data sets 60A than to images 62 related to normal data sets 60N. If a real-time image 62 is determined to be abnormal, then the neural network can determine the specific component failure based on the component failure that occurred when that abnormal data set 60A was recorded by the previous vehicle V.

At step 218, either the central controller 14 and/or the vehicle controller 22 can determine the severity of an upcoming component failure. The severity can be determined, for example, as discussed above with respect to step 125 of method 100. For example, the severity can be determined based on the magnitude of changes in the real-time images 62 as determined by the predictive model PM, based on how far the changes in the real-time images 62 cross the threshold for a period of time, based on a plurality of thresholds having been crossed, by using characteristic data sets 60C when processing with the predictive model PM, and/or by using one or more historical operating characteristic for the vehicle 12 (e.g., stored by the vehicle memory 34).

At step 220, either the central controller 14 and/or the vehicle controller 22 can generate an alert for the driver of the vehicle 12. The alert can be generated, for example, as discussed above with respect to step 126 of method 100.

At step 222, either the central controller 14 and/or the vehicle controller 22 can provide the alert to the driver of the vehicle 12. The alert can be provided, for example, as discussed above with respect to step 127 of method 100.

FIG. 4 illustrates a second example embodiment of a method 300 for predicting component failure in a vehicle 12 and alerting a driver. Some or all of the steps of method 300 can be stored as instructions on the vehicle memory 34 and/or the central memory 54 and can be executed by the vehicle processor 32 and/or the central processor 52 in accordance with the respective instructions stored on the vehicle memory 34 and/or the central memory 54. It should be understood from this disclosure that some of the steps described herein can be reordered or omitted without departing from the spirit or scope of method 300.

At step 302, the central controller 14 collects sensor data 30 from a plurality of vehicles V. The vehicles V can be the same or a similar make and/or model as the vehicle 12 for which the method 200 will be applied. Alternatively, the vehicle 12 can be among a subset of the vehicles V. For each trip that a vehicle V takes, sensor data 30 can be collected and associated with one or more operating characteristic for that trip.

At step 304, the central controller 14 can sort the sensor data 30 into a plurality of data sets 60. If the vehicle 12 is among a subset of the vehicles V for which sensor data was collected, the sensor data 30 from vehicles V the same as or similar to the vehicle 12 can first be separated. Then, in various embodiments, the sensor data 30 from similar vehicles V can be sorted by one or more of: (i) time period of collection; (ii) normal or abnormal operation of the vehicle during collection; and (iii) one or more operating characteristic sensed during collection. These various embodiments are explained in more detail above with respect to step 114 of method 100.

At step 306, the central controller 14 can develop covariance data using the sensor data 30 generated during normal operation of a vehicle V (e.g., using normal data sets 60N). In developing the covariance data, the central controller 14 can establish whether a correlation exists between multiple pairs of sensor data 30 during normal operation of a vehicle V. For example, the central controller 14 can establish whether a correlation exists between pairs for sensors 26 for each normal data set 60N. In an embodiment, the correlation can be a YES or NO correlation (e.g., either a correlation exists or does not exist between a pair of sensors 26 within a data set 60). Whether or not a correlation exists between a pair of sensors 26 can be determined according to a similar pattern over a time interval and/or according to a predetermined threshold for change. In an embodiment, a degree of correlation can also be considered.

At step 308, the central server 14 can develop a database of graphs 64 using the covariance data determined at step 306. Each graph 64 can represent, for example, a plurality of correlations between pairs of sensors 26 for a specific time interval. The graphs 64 can be formed using a community detection algorithm with data from the data sets 60. More specifically, the graphs 64 can be formed, for example, using a community detection algorithm with the covariance data determined from the data sets 60. In an embodiment, a graph 64 can be created by forming clusters of nodes 68 with the data points from the data sets 60, and by connecting correlated data points with a connecting line 66. In an embodiment, the connecting lines 66 can be used to set the thresholds for what is normal data.

FIG. 4 at step 308 illustrates an example embodiment of a portion of a community detection graph 64. Here, the graph 64 includes three nodes 68 which relate to a first sensor 26a, a second sensor 26b, and an nth sensor 26n, respectively. The first sensor 26a and the second sensor 26b are connected by a connecting line 66, indicating a correlation between the first sensor 26a and the second sensor 26b. Likewise, the second sensor 26b and the nth sensor 26n are connected by a connecting line 66, indicating a correlation between the second sensor 26b and the nth sensor 26n. On the other hand, the first sensor 26a and the nth sensor 26n are not connected by a connecting line 66, indicating no correlation between the first sensor 26a and the nth sensor 26n. Using graphs 64 such as the graph 64 shown in FIG. 4, the number of clusters and the nodes per cluster can be evaluated for different types operating characteristics (e.g., low speed vs. medium speed vs. high speed).

At step 310, the central server 14 can process the graphs 64 to generate and/or train a predictive model PM. The central server 14 can process the graphs 64, for example, by performing a change detection algorithm using a plurality of the graphs 64. Using the change detection algorithm, the central server 14 can determine a normal amount of changes in the graphs 64 over a period of time (e.g., changes in cluster numbers, node numbers, connecting lines 66, etc.). Using this information, the central server 14 can determine a threshold for change that the sensors 26 experience during periods of normal operation, such that changes within the threshold should not raise any alarms or indicate an anomaly. In an embodiment, the central server 14 can separately process graphs 64 for characteristic data sets 60C related to different operating characteristics to determine different thresholds for change depending on the operating characteristics. In an embodiment, the central server 14 can also process abnormal data sets 60A to determine thresholds and/or patterns related to various vehicle component failures, for example, which occur during various operating conditions.

In an embodiment, the predictive model PM includes a neural network configured to analyze the graphs 64 for likeness. For example, the neural network can be trained to recognize differences in connecting lines 66 in various graphs 64. The neural network can also be trained to distinguish normal data from abnormal data based on the differences in clusters of nodes 88, nodes 88 and/or connecting lines 66. Thus, the neural network can be trained, using similar graphs 64 that led to specific component failures in a vehicle V, to predict a specific upcoming component failure in the vehicle 12 for which the method 300 is applied. The neural network can further be trained to use characteristic data sets 60C to predict upcoming vehicle failure depending on the operating characteristics experienced by the vehicle 12, for example, due to the driving style of the driver.

At step 312, the predictive model PM is stored. The predictive model PM can include a neural network that has been trained using the graphs 64 at step 310. The predictive model can be stored, for example, using the vehicle memory 34 or the central memory 54.

At step 314, a vehicle 12 begins to generate sensor data 30. In an embodiment, the initial sensor data 30 generated by the sensors 26 of the vehicle 12 can be used to calibrate the predictive model PM as discussed above with respect to steps 121 and 122 of method 100 (not shown in FIG. 4). Alternatively, the predictive model PM can be generic to the vehicle 12 and require no further calibration. If the predictive model PM is stored by the central memory 54, then the vehicle controller 14 can transmit the sensor data 30 to the central controller 14 regularly or at intervals. Alternatively, the predictive model PM can be transferred from the central memory 54 to the vehicle memory 34 and stored thereon.

At step 316, either the central controller 14 or the vehicle controller 22 processes the sensor data 30 using the predictive model PM. The data can be processed in the same way as discussed above with respect to steps 304 to 310. That is, the sensor data 30 can be separated into data sets 60, correlations between pairs of sensors 26 in the data sets 60 can be determined, and/or the correlations can be used to create real-time graphs 64 representative of the real-time sensor data 30 from the vehicle 12. In an embodiment, clusters of nodes 66 within the real-time graph 64 can be detected and can be compared to the graphs 64 used to train the predictive model PM. In another embodiment, individual nodes within the real-time graph 64 can be detected and can be compared to the graphs 64 used to train the predictive model PM. In another embodiment, connecting lines 66 within the real-time graph 64 can be detected and can be compared to the graphs 64 used to train the predictive model PM. In each of these methods, the predictive model PM includes a baseline for comparison and can determine whether the deviation from that baseline is within a threshold for normal behavior.

In another embodiment, either the central controller 14 or the vehicle controller 22 can use the predictive model PM to determine the magnitude of the difference between the real-time graphs 64 and the graphs 64 used to train the predictive model PM. Depending on the outcome, the magnitude of the difference determined by the predictive model PM can be used, for example, with an additional physics-based model to determine the severity of the upcoming vehicle component failure.

In another embodiment, either the central controller 14 or the vehicle controller 22 can use the predictive model PM to determine which vehicle component will fail based on likeness with abnormal data sets 60A used in training at step 210. For example, a neural network can be trained with graphs 64 generated from abnormal data sets 60A, and can therefore determine whether the real-time graphs 64 from the vehicle 12 are more similar to graphs 64 related to abnormal data sets 60A than to graphs 64 related to normal data sets 60N. If a real-time graph 64 is determined to be abnormal, then the neural network can determine the specific component failure based on the component failure that occurred when that abnormal data was recorded by the previous vehicle V.

At step 318, either the central controller 14 and/or the vehicle controller 22 can determine the severity of an upcoming component failure. The severity can be determined, for example, as discussed above with respect to step 125 of method 100. For example, the severity can be determined based on the magnitude of changes between the real-time graphs 64 and the previous normal graphs 64 as determined by the predictive model PM, based on how far the changes in the real-time graphs 64 cross the threshold over a period of time, based on a plurality of thresholds having been crossed, by using characteristic data sets 60C when processing with the predictive model PM, and/or by using one or more historical operating characteristic for the vehicle 12 (e.g., stored by the vehicle memory 34).

At step 320, either the central controller 14 and/or the vehicle controller 22 can generate an alert for the driver of the vehicle 12. The alert can be generated, for example, as discussed above with respect to step 126 of method 100.

At step 322, either the central controller 14 and/or the vehicle controller 22 can provide the alert to the driver of the vehicle 12. The alert can be provided, for example, as discussed above with respect to step 127 of method 100.

FIG. 5 illustrates a third example embodiment of a method 400 for predicting component failure in a vehicle 12 and alerting a driver. Some or all of the steps of method 400 can be stored as instructions on the vehicle memory 34 and/or the central memory 54 and can be executed by the vehicle processor 32 and/or the central processor 52 in accordance with the respective instructions stored on the vehicle memory 34 and/or the central memory 54. It should be understood from this disclosure that some of the steps described herein can be reordered or omitted without departing from the spirit or scope of method 200.

At step 402, the central controller 14 collects sensor data 30 from a plurality of vehicles V. The vehicles V can be the same or a similar make and/or model as the vehicle 12 for which the method 400 will be applied. Alternatively, the vehicle 12 can be among a subset of the vehicles V. For each trip that a vehicle V takes, sensor data 30 can be collected and associated with one or more operating characteristic for that trip.

At step 404, the central controller 14 can sort the sensor data 30 into a plurality of characteristic data sets 60C. Here, the sensor data 30 is clustered by the characteristic data sets 60C. In FIG. 5, the sensor data 30 is shown clustered by a first characteristic data set 60a, a second characteristic data set 60b, and an nth characteristic data set 60n. Each characteristic data set 60 can include multiple clusters. Each parameter data set 60 can be based on an operating characteristic experienced by the vehicle V during generation of the sensor data 30. For example, the first characteristic data set 60a can relate to average trip speed and/or acceleration, the second characteristic data set 60b can relate to average RPMs, torque or oil temperature, and the nth characteristic data set 60c can relate to average number of braking or acceleration events. Here, each characteristic data set 60C represents a set of problems (e.g., transmission, fuel system, engine, etc.) Each characteristic data set 60C can include clusters of sensor data points associated with one or more operating characteristic. Thus, each data point within each characteristic data set 60C can include a sensor reading and an operating characteristic associated with the sensor reading.

At step 406, the central controller 14 can reduce each cluster within each characteristic data set 60C to a smaller number of aggregated signals. The clusters can be reduced to a smaller number of aggregated signals, for example, using a principal component analysis (PCA) (e.g., a PCA or kernel PCA), a uniform manifold approximation and projection (uMAP), t-distributed scholastic neighbor embedding (t-SNE), and/or the like. For example, a first characteristic data set 60a will have a plurality of clusters $CA_1$, $CA_2 \ldots CA_N$. Here, each clusters $CA_1$, $CA_2 \ldots CA_N$ be reduced to one or more aggregated signals.

At step 408, the central controller 14 can determine the distribution statistics of each aggregated signal for each cluster in each characteristic data set 60C. The statistics can be determined, for example, using distribution, mean, variation, correlation, and/or similar methods. For example, a first characteristic data set 60a will have a plurality of aggregated signals, with each aggregated signal related to a cluster. Here, distribution statistics related to each aggregated signal can be determined such that each aggregated signal within each data set has its own distribution statistics.

In a simplified example, sensor data 30 has been divided into a first characteristic data set 60a (e.g., based on average trip speed and/or acceleration), a second characteristic data set 60b (e.g., based on average temperature, torque or oil temperature), and an nth characteristic data set 60n (e.g., based on an average number of braking or acceleration events). Thus, at step 408, the first characteristic data set 60a can have a plurality of clusters $CA_1 \ldots CA_N$, with each cluster $CA_1 \ldots CA_N$ having its own distribution statistics; the second characteristic data set 60b can have a plurality of clusters $CB_1 \ldots CB_N$, with each cluster $CB_1 \ldots CB_N$ having its own distribution statistics; and the nth characteristic data set 60n can have a plurality of clusters $CC_1 \ldots CC_N$, with each cluster $CC_1 \ldots CC_N$ having its own distribution statistics.

At step 410, the central controller 14 can process the characteristic data sets 60C to generate and/or train a predictive model PM. For example, the central controller 14 can develop an algorithm using the distribution statistics for each cluster of each characteristic data set 60C. In an embodiment, the predictive model PM can include a neural network. A neural network approach can be developed, for example, using autoencoder architecture for the distribution statistics for each cluster in the parameter data sets 60.

At step 412, the predictive model PM is optimized to duplicate the normal data, for example, for each cluster within a characteristic data set 60C and/or for each characteristic data set 60C. In an embodiment, the predictive model PM includes a neural network configured to analyze the distribution statistics for likeness. The neural network can further be trained to distinguish normal data from abnormal data based on the distribution statistics. The neural network can further be trained, using distribution statistics that led to specific component failures in a vehicle V, to predict a specific upcoming component failure in the vehicle 12 for which the method 400 is applied. The neural network can further be trained to predict upcoming vehicle failure depending on the operating conditions typically experienced by the vehicle 12, for example, due to the driving style of the driver.

At step 414, the predictive model PM is stored. The predictive model PM can include a neural network that has been trained using distribution statistics at step 410. The predictive model PM can be stored, for example, using the vehicle memory 34 or the central memory 54.

At step 416, a vehicle 12 begins to generate initial sensor data 30. Step 416 can occur, for example, when the vehicle 12 is new or during a first predetermined distance driven by the vehicle 12.

At step 418, the initial sensor data 30 generated by the sensors 26 of the vehicle 12 can be used to calibrate the predictive model PM stored at step 414. Here, the sensor data 30 can be divided into characteristic data sets 60C as performed at step 404. Thus, each characteristic data set 60C can be based on an operating characteristic from the vehicle 12 which occurred while the sensor data 30 was generated.

In an embodiment, at step 418, the autoencoder architecture used during steps 410 and/or 412 can be applied to the initial sensor data 30 from the vehicle 12. For example, the autoencoder architecture can be applied to distribution statistics for each cluster of each characteristic data set 60C. In this way, the predictive model PM can be calibrated for the vehicle 12, for example, to account for the setting/sensitivities of the sensors 26. In an embodiment, the calibration procedure can apply weights to inputs in the predictive model PM which are determined from the sensor data 30. Alternatively, the calibration procedure can apply the weights to values stored within the predictive model PM so as to fit the predictive model to the sensors 26 of the vehicle 12. In another embodiment, the calibration procedure can apply the weights to the thresholds determined by the predictive model PM and/or in an additional physics-based model. By calibrating the predictive model for the vehicle 12, the thresholds for anomaly detection can be adjusted to the sensors 26 of the vehicle 12.

In an embodiment, the calibration procedure can be used to select a best metric for anomaly detection for signals in each cluster of each characteristic data set 60C. For example, the distribution statistics for the clusters within the characteristic data sets 60C from the initial sensor data 30 for the vehicle can be determined using distribution, mean, variation, correlation, and/or similar methods. These distribution statistics can be compared to those used to train the predictive model PM, and the best metric can be used for the calibrated predictive model PM to establish a threshold for anomaly detection.

At step 420, a vehicle 12 begins normal use and generates sensor data 30. The sensor data 30 can be from at least one vehicle sensor 26 of the vehicle 12 over a period of time. For example, the sensor data 30 can be generated during regular use of the vehicle 12 for day-to-day activities. The sensor data 30 can include the same type of sensor data 30 used to develop and train the predictive model PM at steps 410 and/or 412 and/or the same type of sensor data 30 used to calibrate the predictive model at step 418.

At step 422, either the central controller 14 or the vehicle controller 22 processes the sensor data 30 using the predictive model PM. The central controller 14 or the vehicle controller 22 can process the sensor data 30 to determine that one or more threshold (e.g., determined at steps 410, 412 and/or 418) has been crossed. In an embodiment, the sensor data 30 can be sorted according to operating characteristics, clustered, and/or used to determine distribution statistics as discussed above. In an embodiment, the distribution statistics can be processed using the predictive model PM to determine whether the threshold has been crossed for a period of time. The specific distribution statistics used for predictive model processing can be chosen, for example, based on the calibration at step 418.

At step 424, either the central controller 14 and/or the vehicle controller can determine the severity of an upcoming component failure. The severity can be determined, for example, as discussed above with respect to step 125 of method 100. For example, the severity can be determined based on the magnitude of the distribution statistics in comparison to the determined threshold for an anomaly, based on how far the magnitude of the distribution statistics cross the threshold, based on a plurality of thresholds having been crossed, by using separate thresholds for different characteristic data sets 60C, and/or by using one or more historical operating characteristic for the vehicle 12 (e.g., stored by the vehicle memory 34).

At step 426, either the central controller 14 and/or the vehicle controller 22 can generate an alert for the driver of the vehicle 12. The alert can be generated, for example, as discussed above with respect to step 126 of method 100.

At step 428, either the central controller 14 and/or the vehicle controller 22 can provide the alert to the driver of the vehicle 12. The alert can be provided, for example, as discussed above with respect to step 127 of method 100.

Various steps described above for method 100, and for methods 200, 300 and 400 which are example embodiments of method 100, can be performed by either the central controller 14 and/or the vehicle controller 22 without departing from the spirit or scope of the present disclosure. FIGS. 6 to 9 illustrate alternative embodiments of structure that can be used to implement the methods disclosed herein.

FIG. 6 illustrates an example embodiment of a vehicle controller 22A within a vehicle 12A in which the central server 14 stores the predictive model PM and processes the sensor data 30. Here, the central controller 14 is in wireless communication with the vehicle controller 22A. In this embodiment, the sensor data 30 includes CAN signals which are transmitted from the vehicle controller 22A to the central controller 14, so that the central controller 14 can determine when a vehicle component failure will occur according to the methods discussed herein. The central controller 14 can then generate the alert for the driver of the vehicle (e.g., the "Message on Component Failure") and cause the alert to be displayed on the user interface 24 via wireless communication with the vehicle controller 22A.

FIG. 7 illustrates an example embodiment of a vehicle controller 22B within a vehicle 12B in which the vehicle controller 22B stores the predictive model PM and processes the sensor data 30. Here, the vehicle controller 22B uses a telematics applications processor 70 to store the predictive model PM. In this embodiment, the sensor data 30 includes CAN signals which are transmitted to the telematics applications processor 70, so that the telematics application processor 70 can determine when a vehicle component failure will occur according to the methods discussed herein. The telematics application processor 70 can also generate the alert for the driver of the vehicle and cause the alert to be displayed on the user interface 24.

FIG. 8 illustrates another example embodiment of a vehicle controller 22C within a vehicle 12C in which the vehicle controller 22C stores the predictive model PM and processes the sensor data 30. Here, the vehicle controller 22 uses a telematics applications processor 70 and a Field Programmable Gate Array ("FPGA") coprocessor 72. The FPGA coprocessor 72 can be optimized for neural networks and can store the predictive model PM including any neural networks associated therewith. In this embodiment, the sensor data 30 includes CAN signals which are transmitted to the FPGA coprocessor 72, so that the FPGA coprocessor 72 can determine when a vehicle component failure will occur according to the methods discussed herein. The telematics application processor 70, which is in operative communication with the FPGA coprocessor 72, can then generate the alert for the driver of the vehicle and cause the alert to be displayed on the user interface 24 based on the determination made by the FPGA coprocessor 72.

FIG. 9 illustrates another example embodiment of a vehicle controller 22D within a vehicle 12D in which the vehicle controller 22D stores the predictive model and processes the sensor data 30. Here, the vehicle controller 22 includes a telematics application processor 70, a Field Programmable Gate Array ("FPGA") coprocessor 72, and a separate central processing unit ("CPU") 74. The FPGA coprocessor 72 can be optimized for neural networks and can operate in combination with the CPU 74 to store the predictive model PM including any neural networks associated therewith. In this embodiment, the sensor data 30 includes CAN signals which are transmitted to the FPGA coprocessor 72 and/or CPU 74, so that the FPGA coprocessor 72 in combination with the CPU 74 can determine when a vehicle component failure will occur according to the methods discussed herein. The telematics application processor 70, which is in operative communication with the FPGA coprocessor 72 and/or CPU 74, can then generate the alert for the driver of the vehicle and cause the alert to be displayed on the user interface 24 based on the determination made by the FPGA coprocessor 70.

FIGS. 6 to 9 further illustrate other components which can be included within or associated with a vehicle controller 22. For example, a data transmission device 36 can include one or more of a wifi system 80, a wireless modem 81 and/or a Bluetooth low energy ("BLE") system 82, each of which can be associated with an antenna 83. A data transmission device 36 and/or a GPS device 42 can include a positioning receiver 84 and/or a GNSS antenna 85. A vehicle memory 34 can include, for example, one or more of an SDRAM system 86, a flash system 87, and a memory system 88. A vehicle processor 32 can include, for example, a voltage regulator 89 in communication with a positive battery and/or a bus transceiver 90 in communication with a data switch 91. The vehicle processor 32 can further be placed in communication with motion sensors 92 which can be included within or be separate from the sensors 26 discussed herein. Those of ordinary skill in the art should recognize from this disclosure that these are examples only, which are illustrated for the purpose of explaining that there are multiple configurations which can be used to implement the present disclosure.

As illustrated, FIG. 6 illustrates an example embodiment in which the central server 14 stores the predictive model PM and processes the sensor data 30, whereas FIGS. 7 to 9 illustrate example embodiments in which the vehicle controller 22 stores the predictive model PM and processes the sensor data 30. By locating the predictive model PM locally on the vehicle 12, as shown in FIGS. 7 to 9, wireless transmission costs from the vehicle 12 can be advantageously reduced. Alternatively, by transmitting sensor data 30 to the central processor 14, the generic predictive model PM stored by the central controller 14 can be constantly updated and improved.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "configured" as used herein to describe a component, section or part of a device includes hardware and/or software that is constructed and/or programmed to carry out the desired function.

The term "processor" as used herein can refer to one or more processors, such as one or more special purpose processors, one or more digital signal processors, one or more microprocessors, and/or one or more other processors as known in the art.

The term "memory" as used herein can refer to any computer useable or computer readable medium or device that can contain, store, communicate, or transport any signal or information that can be used with any processor. For example, a memory can include one or more read only memory (ROM), random access memory (RAM), one or more other memory, and/or combinations thereof.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method for predicting component failure in a vehicle and alerting a driver based thereon, the method comprising:
   receiving sensor data from at least one vehicle sensor over a period of time;
   processing covariance data using a model to detect an anomaly indicative of an upcoming component failure, the covariance data based on a plurality of characteristic data sets created from the sensor data;
   determining a severity of the upcoming component failure based on at least one operating characteristic of the vehicle; and
   providing an alert to the driver of the vehicle regarding the severity of the upcoming component failure.

2. The method of claim 1, wherein
determining the severity of the upcoming component failure includes calculating an estimated time or distance remaining until the upcoming component failure based on the at least one operating characteristic of the vehicle.

3. The method of claim 2, wherein
providing the alert to the driver includes notifying the driver of the estimated time or distance remaining until the upcoming component failure.

4. The method of claim 1, further comprising
training the model to detect the anomaly using time-series data from a plurality of similar vehicles.

5. The method of claim 1, further comprising
storing the model on a memory of the vehicle.

6. The method of claim 1, wherein
the at least one operating characteristic includes at least one of: (i) average trip speed of the vehicle; (ii) average acceleration of the vehicle; (iii) average revolutions per minute; (iv) average torque experienced by the vehicle; (v) average oil temperature experienced by the vehicle; and (vi) average number of braking or acceleration events experienced by the vehicle.

7. The method of claim 1, further comprising
creating at least one image using the sensor data,
wherein processing the covariance data using the model includes processing the at least one image using the predictive model.

8. A method for predicting component failure in a vehicle and alerting a driver based thereon, the method comprising: receiving sensor data from at least one vehicle sensor over a period of time; separating the sensor data into a plurality of characteristic data sets corresponding to different operating characteristics of the vehicle; processing covariance data based on a multiple of the characteristic data sets using a model to detect an anomaly indicative of an upcoming component failure; and providing an alert to the driver of the vehicle regarding the upcoming component failure.

9. The method of claim 8, further comprising creating at least one image using at least one of the characteristic data sets, wherein processing the covariance data based on a multiple of the characteristic data sets using the model includes processing the at least one image using the model.

10. The method of claim 9, wherein the at least one image is created using a multiple of the plurality of characteristic data sets.

11. The method of claim 8, wherein
separating the sensor data into the plurality of characteristic data sets includes separating the sensor data into the plurality of characteristic data sets based on correspondence with at least one of: (i) trip speed; (ii) acceleration; (iii) revolutions per minute; (iv) torque; (v) oil temperature; and (vi) number of braking or acceleration events.

12. The method of claim 8, further comprising training the model to detect the anomaly using time-series data from a plurality of similar vehicles.

13. The method of claim 8, further comprising calculating an estimated time or distance remaining until the upcoming component failure,
wherein providing the alert to the driver includes notifying the driver of the estimated time or distance remaining until the upcoming component failure.

14. A method for predicting component failure in a vehicle and alerting a driver based thereon, the method comprising: receiving sensor data from at least one vehicle sensor over a period of time: separating the sensor data into a plurality of characteristic data sets corresponding to different operating characteristics of the vehicle; creating at least one image using covariance data based on a multiple of the plurality of characteristic data sets; processing the at least one image using a model to detect an anomaly indicative of an upcoming component failure; and providing an alert to the driver of the vehicle regarding the upcoming component failure.

15. A system for predicting component failure in a vehicle and alerting a driver based thereon, the system comprising:
at least one vehicle sensor configured to generate sensor data relating to at least one vehicle component over a period of time;
a memory storing at least one operating characteristic of the vehicle and at least one model that has been trained using time-series data from a plurality of other vehicles; and
a processor configured to execute instructions stored on the memory to: (i) process covariance data created from the sensor data using the model to detect an anomaly indicative of an upcoming component failure; (ii) determine a severity of the upcoming component failure based on the at least one operating characteristic of the vehicle; and (iii) provide an alert to the driver of the vehicle regarding the severity of the upcoming component failure.

16. The system of claim 15, wherein
at least one of the processor and the memory is located within the vehicle.

17. The system of claim 15, wherein
the processor is configured to cluster the sensor data in a plurality of characteristic data sets corresponding to different operating characteristics of the vehicle, and to process at least one of the characteristic data sets using the model to detect the anomaly indicative of the upcoming component failure.

18. The system of claim 15, wherein
the vehicle includes a display, and
the processor provides the alert to the driver by altering the display based on the severity of the upcoming component failure.

* * * * *